United States Patent
Myers et al.

(10) Patent No.: US 12,519,620 B2
(45) Date of Patent: Jan. 6, 2026

(54) GENERATING AND MANAGING GROUP IDENTITIES

(71) Applicant: Apple Inc., Cupertino, CA (US)

(72) Inventors: Steven A Myers, Cupertino, CA (US); Mariappan Rengarajan, San Carlos, CA (US); Benjamin W Brown, Los Altos, CA (US); Meenakshi Arasu, Milpitas, CA (US); Aniwat Arromratana, San Jose, CA (US); Nithin Koram, Austin, TX (US); Ramarathnam Santhanagopal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 18/328,691

(22) Filed: Jun. 2, 2023

(65) Prior Publication Data
US 2023/0396416 A1 Dec. 7, 2023

Related U.S. Application Data

(60) Provisional application No. 63/365,862, filed on Jun. 4, 2022.

(51) Int. Cl.
*H04L 29/06* (2006.01)
*H04L 9/08* (2006.01)
*H04L 9/30* (2006.01)

(52) U.S. Cl.
CPC .............. *H04L 9/0833* (2013.01); *H04L 9/30* (2013.01)

(58) Field of Classification Search
None
See application file for complete search history.

(56) References Cited

FOREIGN PATENT DOCUMENTS

| AU | 2014274590 A1 * | 1/2015 | ......... G06F 21/6218 |
| WO | WO-2013123548 A2 * | 8/2013 | ......... G06F 21/6218 |

* cited by examiner

*Primary Examiner* — Andrew J Steinle
(74) *Attorney, Agent, or Firm* — Kilpatrick Townsend & Stockton LLP

(57) ABSTRACT

Techniques are provided to create and manage groups of users. A group can be treated as a single entity. For privacy of a user, user keys can be translated to group keys, which are then used to access resources. The user can prove membership in the group via their keys (e.g., using a diversified public key), and then get the group keys in response, e.g., after verification to a group server using a diversified user key.

20 Claims, 14 Drawing Sheets

GENERATING AND MANAGING GROUP IDENTITIES

CROSS-REFERENCES TO RELATED APPLICATIONS

This application claims priority to and is a non-provisional of U.S. Provisional Application 63/365,862, entitled "Generating And Managing Group Identities," by Myers et al., filed Jun. 4, 2022, which are herein incorporated by reference in its entirety for all purposes.

BACKGROUND

A cloud provider can provide resources (e.g., data, services, etc.) to a group of users. For example, a cloud provider can allow a group of users to collectively upload and access photos among the devices of the group of users. A family may want to do this, so that it is easy for the family members to share their experiences, and it is more convenient than emailing or text messaging every photo to everyone. However, the cloud provider typically has access to members within such group, and the group's integrity is at risk as the cloud provider can add or delete members at will without the group's consent.

Embodiments of the disclosure address this problem and other problems individually and collectively.

BRIEF SUMMARY

Techniques are provided to create and manage groups of users. A group can be treated as a single entity. For privacy of a user, user keys can be translated to group keys, which are then used to access resources. The user can prove membership in the group via their keys (e.g., using a diversified public key), and then get the group keys in response, e.g., after verification to a group server using a diversified user key.

Some embodiments include a method of managing a group of devices including an administrator device. In various examples, each device can have its own key, and one or more devices of a user can share a user key. The administrator device can generate a group blob, invite(s), and acceptance response(s). Each invite and acceptance response can be designated for other device(s) of the group. Each invite can include, but is not limited to, a group ID corresponding to a group entity and a diversifying factor that can be used to generate a diversified user public key from a corresponding user public key. Each acceptance response can include, but is not limited to, encrypted cryptographic data specific to another device. The group blob can include, but is not limited to, (1) an encrypted payload including a list of users for the group entity, public keys for the group of devices, and one or more group keys or one or more seeds for generating the one or more group keys, (2) the diversified user public keys for the other device(s). Upon generating the group blob, invite(s), and acceptance response(s), the administrator device can transmit the group blob, the group ID, and the acceptance response(s) to a server system. The administrator device can then receive a notification of the server system accepting the group blob from the server system. The administrative device can transmit the invite(s) to the other device(s) of the group. The invite(s) can enable the other device(s) to obtain the group blob from the server system and can enable decryption of the group blob.

Another embodiment of the disclosure includes a method of joining a group of devices including an administrator device and a user device. The user device can receive an invite from the administrator device. The invite can include, but not limited to, a group ID for a group entity including the group of devices, and a diversifying factor. The user device can generate an acceptance message that comprise, but not limited to, (1) the group ID and (2) a signature of at least a portion of the acceptance message. The signature can be generated with a signing key of the user device and the diversifying factor. The user device can transmit the acceptance message and the signature to a server system for validation. The user device can then receive an acceptance response from the server system. The acceptance response can contain cryptographic data that can be specific to the user device and that can be from the administrator device. The user device can then decrypt the acceptance response using a user decryption key to obtain the cryptographic data. The user device can then receive a group blob to the server system. The group blob can include, but not limited to, an encrypted payload including a list of users for the group entity, public keys for the group of devices, and one or more group keys or one or more seeds for generating the one or more group keys. The user device can decrypt the encrypted payload of the group blob using the cryptographic data to obtain the one or more seeds or the one or more group keys.

Yet another embodiment of the disclosure includes a method of managing a group of devices including an administrator device and a user device having a user public key by a server system. The method can be performed by the server system. The server system can receive a group blob from the administrator device. The group blob can include (1) an encrypted payload including a list of users for a group entity, public keys for the group of devices, and one or more group keys or one or more seeds for generating the one or more group keys, (2) diversified user public keys for other device(s) of the group, and (3) a group ID. The diversified user public key in the group blob can be generated using a corresponding user public key and a diversifying factor. The server system can receive an acceptance message from a first device of the other device(s). The acceptance message can comprise, but not limited to, the group ID and a signature of at least a portion of the acceptance message, the signature generated with a signing key of the first device and the diversifying factor. The server system can then verify the signature using the diversified user public key of the first device. The server system can provide the group blob to the first device.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

DETAILED DESCRIPTION

Figure 1:
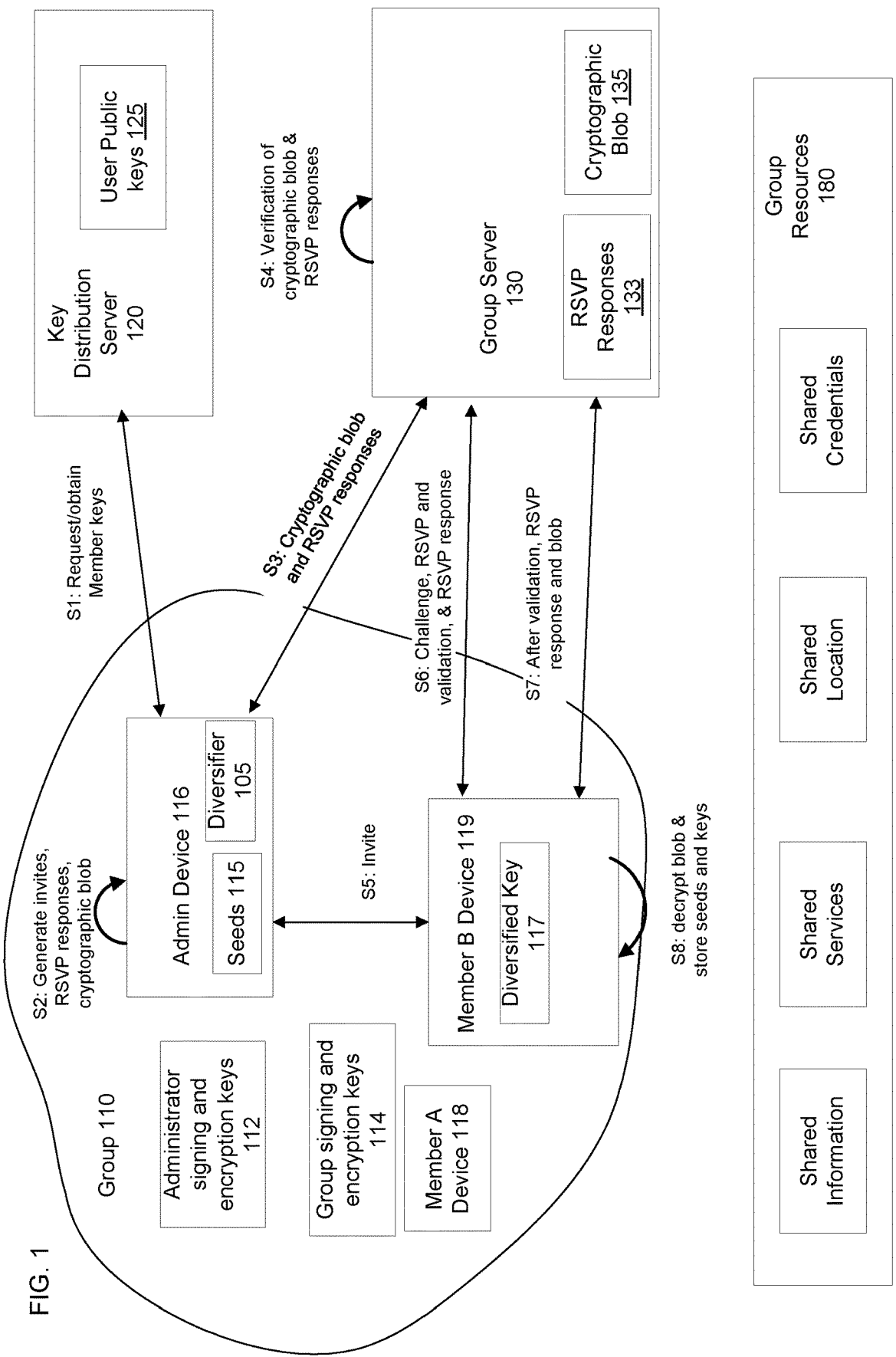
FIG. 1 shows a block diagram of a system for an administrator device registering a member device in a group with group services.

To manage access control to resources, a simple database with a server enforcing access control can assign the resources once the groups are formed and identified. However, such an implementation requires the server to know the identity of all the users, which may be undesirable to user who want privacy. In cases where the members within a group are opaque to the server, then such an implementation cannot provide access control based on identity of members. Accordingly, managing access to such shared data and services can be complicated from a security and privacy standpoint, as typical techniques would require the cloud provider to know the identity of all the users. Thus, users would sacrifice privacy. The group's integrity is also at risk as the provider can add or delete members at will.

To maintain privacy of a user's personal keys (which could be used to identify the user), user keys are translated to group keys, which are then used to access resources, thereby shielding identity of an individual within a group to the server. An additional security measure, embodiments can translate (diversify) keys per user. The individual can prove membership in the group via their keys (e.g., using a diversified public key that shields the user's identity), and then get the group's keys in response, which allows the individual to prove to the cloud system that it is a member of the group without revealing its own individual keys. This translation (e.g., the resulting group keys) would be different for each group that a member is in, e.g., as the group membership changes. In this manner, the server only knows that the authentication information belongs to a user of the group but does not know the particular user. The group server would only know the public group keys of a group that can access a particular group resource. Group administrators can have sole control over membership so that a provider (e.g., cloud server) cannot change membership of a group.

Additionally, giving identities to groups in a cloud server's ecosystem means groups can be persistent, and have identities beyond that of its members. Members can enter and leave a group, and the group will persist. The group can possess resources (e.g., a subscription to a streaming service, encrypted data, or a shared folder) within the cloud server's ecosystem, and the possession of the resources may not be limited when group members change. Having a group own resources directly can prevent the need to duplicate resource ownership across multiple group entities. It also allows the handoff of resources when group membership changes (e.g., complete rotation of membership).

To allow a server to authenticate and manage members while not learning their identity, an administrator (admin) can send an invite to members, where the invite includes a diversifier (also referred to as a diversifying factor). The diversifier can be used to generate a diversified public key for the member, where the diversified public key is provided to the server for authenticating the user. The diversified public keys of the members can be provided to the server in a group blob sent to the server. The group blob can also include an encrypted payload that includes seeds for generating groups keys and/or the groups keys themselves. The encrypted payload can be provided to authenticated users.

After receiving an invite, a user can send an acceptance message to the server asking to be part of a group. Once a member is authenticated, the server can provide an acceptance response that was initially received from the admin. The acceptance response can include cryptographic data specific to a particular user for decrypting the encrypted payload. In this manner, access to the encrypted payload can be controlled and provided to members that accept the invite and who are authenticated. The user can then use the group keys (as received or as generated) to act as part of the group.

When users are added or removed, a group blob can be updated and group keys can be updated. Seed blobs can also be used, e.g., to allow previous members to still see old data (e.g., encrypted with old group keys) for when they were part of the group and other functionality.

I. System for Creating Group for Accessing Resources

As mentioned above, embodiments can translate knowledge of user's keys, for a user in the group, into knowledge of a group's keys. The user can prove membership in the group via their keys and then gets the group's keys in response, which allows the user to prove to the cloud server that it is a member of the group, by use of the group's keys.

Various functionalities can be provided by various implementations of a system for managing a group and its members. The system can include users (members and admins), one or more servers, and any group resources, as well as cryptographic objects. Some example functionalities are provided. The system can form groups based on other users' keys, assigning some users as administrators who will be able to further modify the group. During creation of the group, the system can assign a unique group identifier that will persist across membership changes of the group. The system can modify groups based on other user's keys, and the user's own keys. Modification of status in a group can require possession of administrative keys. The retrieval of the group's keys can be controlled on the condition that the user possess one of the user keys corresponding to that of a group member. The retrieval of the group's administrative keys can be controlled on the condition that the user possess one of the user keys corresponding to that of an administrative group member.

In order to deliver the functionalities, the system can include key distribution services for distributing user keys, group services for managing access to group keys, and a client group interface (e.g., an SPI (service provider interface), an API (application programming interface), and the like) that executes on the user devices. Herein, references to an SPI equally apply to an API, as well as other interface.

FIG. 1 shows a block diagram of a system for an administrator device registering a member device in a group with group services. As shown, admin device 116 (also referred to as an inviter device) invites a member B device 119 to a group 110. The group 110, a key distribution server 120, and a group server 130 can be in active communication with each other. Upon successful registration, the member B device 119 can have access to group resources 180.

The key distribution server (KDS) 120 can be a system that converts a user's handle(s) to any keys that represent the user, and a unique user ID representing the user. Here a handle is a string that users commonly use to uniquely identify each other including, but not limited to, email addresses and phone numbers.

The member B device 119 can generate individual private, public key pairs so that only the member B device 119 can know the private keys and register the public keys to the key distribution server 120. The private keys can be individual signing and decryption keys while the public keys can be individual verification and encryption keys. In some embodiments, the member B device 119 can generate encryption key signature and verification key signature using the individual signing key and register the signatures along with the public keys to the KDS.

A user can be assigned different keys for different user devices of the user. Some embodiments can implement cross-signing of such keys across the user devices of a user, e.g., for inviting all devices of a user to a group. Thus, user keys can be shared across multiple of the user's devices, such that by adding key(s) of one user device then all devices of the user can be invited to the group. For example, a key for a user device can be sent to KDS, but that key can be cross signed by key(s) of other device(s) so that the system will know the other devices. For cross-signing, each device can sign the other device's keys to identify that the devices are all related to each other. If device A and device B sign each other keys, there is a trust relationship between the two devices, which allows other device(s) to be added or trusted based on another device being added or trusted.

The admin device 116 can obtain individual public keys (e.g., verification and encryption keys) of the member B device 119 when the admin device 116 provides the handle or the unique user ID to the key distribution server 120. The key distribution server 120 can also generate a unique user group identifier for the member B device 119 in the context of a group (or for all groups) and provide the unique user group identifier to the admin device 116. Once the key distribution server 120 provides the individual public keys of the member B device 119, the role of the KDS may stop.

The group server 130 can be a system that allows a user to create, update and query group state information. Group services can serve a group state to all requesters, as privacy is cryptographically limited to those in the group (as defined by key membership). Group services can perform requested updates and modifications to a groups state provided that they are cryptographically authorized by a current administrative group member.

A client device, such as the admin device 116 or the member B device 119, can be a member of zero or more groups. The client device can be added to groups, removed from groups, and access group resources. This can be done by querying both the key distribution server 120 and the group server 130. A client device can have a group interface, e.g., service provider interface (SPI) or an API that can be used by applications on a user device, for different group services.

The group 110 can exist so that once the admin device 116 creates the group 110, the admin device 116 can use the group to access group resources 180. As examples, the group resources can be shared information (e.g., documents, notes, etc.), shared services (e.g., streaming, home kit applications, music, etc.), shared location (e.g., starred restaurants), and/ or shared credential (e.g., user accounts for cloud storage). The group 110 can have an identity so that the group itself can have access to things such as group resources 180. The group 110 can therefore have functionality similar to a "user device".

The group 110 can have administrator devices. The administrator devices can modify the group membership such as adding a new member, removing a member, etc. The administrator devices are part of the member devices that has access to group resources 180. The group 110 can have administrator signing and encryption keys 112, including private signing and public verification, as well as public encryption and private decryption. These can be generated from user public keys of the administrator devices and an admin seed, which is part of seeds 115. Each administrator device can have access to the administrator signing and encryption keys 112.

The group 110 can have group signing and encryption keys 114, including private signing and public verification, as well as public encryption and private decryption. These can be generated by user public keys of the member devices (including the administrator devices) and member seed, which is part of seeds 115. The member devices can use the group signing and encryption keys 114 to prove to the group server 130 or any other server (e.g., that manage group resources 180) that they are part of the group 110 when requesting for access to the group resources 180. Each member device can have access to the group signing and encryption keys 114.

The admin device 116 can create a diversified verification key (an example of diversified keys 117) for each device using a diversifier 105 and the public verification key of the device. The diversifier 105 can be randomly generated and unique for each device. The admin device 116 may send the diversifier 105 to member devices, and each member device can generate a diversified signing key by using the diversifier 105 and the user signing key. The diversified signing key can allow the member device to be verified as an invite device but does not allow the group server to determine the identity of the device. For example, the member B device 119 can use the diversified signing key (another example of diversified signing keys 117) to verify itself as an invite device without revealing its identity to the group server 130. The same device with two different groups can have two separate randomized (diversified) verification keys representing them.

A. Group Creation Overview

The group 110 can be created and members can be added via a process involving admin device 116, group server 130, and member B device 119, as shown. KDS 120 can also be involved.

In step S1, the admin device 116 may want to create a group with the member B device 119 in the group. The admin device 116 can have a handle or unique user ID of a member device, and request from the key distribution server 120 the user public keys 125 of the member B device 119 using the handle. The key distribution server 120, upon receiving the request, can find the user public key(s) of the member B device 119 and send it to the admin device 116. The admin device 116 can receive user public keys of other member devices (e.g., member A device 118) using the same method as above. Alternatively, admin device 116 may obtain the public keys via a different channel, e.g., directly from the other user.

In step S2, the admin device 116 may generate invites, RSVP responses (also referred to as acceptance responses), and a cryptographic blob. The cryptographic blob and RSVP responses are later sent to each member device (e.g., that accepts the invite) by the group server 130 in later steps. The cryptographic blob can contain administrator group public keys (e.g., public keys of keys 112), group public keys (e.g., public keys of keys 114), the diversified verification keys (e.g., public keys of keys 117), hybrid handle (encryption of a symmetric key), and an encrypted payload (e.g., ciphertext) comprising, and all of user public keys for all member devices, seeds 115, etc. The seeds 115 can have two kinds of seeds for two types of membership: administrators and members. In some implementations, the encrypted payload of the cryptographic blob can be encrypted using a symmetric key, which can be generated by users using cryptographic data that is specific to each user. The invites and the RSVP responses can be unique to each member device. The invites can contain a diversifier 105, and each member device can use the diversifier 105 with the user signing key to generate a diversified key 117 (e.g., a diversified signing key) for authentication to group server 130, e.g., as part of accepting the invite. The RSVP responses are sent to each member device that accepted the invite, and the RSVP responses can contain the cryptographic data that can be used to generate the symmetric key from the hybrid handle to decrypt the cryptographic blob.

In step S3, the admin device 116 may send the cryptographic blob and RSVP responses to the group server 130. The group server 130 can store the RSVP responses 133 and cryptographic blob 135.

In step S4, the group server 130 can verify the cryptographic blob and RSVP responses. The verification can include determining the necessary data is included. Further details about the verification are provided later.

In step S5, the admin device 116 may send an invite to the member B device 119. The invite can include diversifier 105 and a group ID, e.g., for determining which group the invite is for. The member B device 119, upon receiving the invite, can generate a diversified key 117 using the diversifier 105 and a public key. More than one diversified key can be generated, e.g., diversified public key(s) and diversified private key(s). The invite can include a diversified public key (generated by admin), which the user can verify using the diversifier 105 and the user's public key. In one aspect, diversifier 105 is distinct from a public key and cannot be derived from the knowledge of the public key or the diversified public key. The received and generated diversified keys will match if they are generated in the same manner. A diversified private key (e.g., a diversifier signing key) can also be generated, e.g., for signing a message to authentic member B device 119 to group server 130, which has the diversified public key to verify the signature.

In step S6, the member B device 119 can store the invite, and optionally request a challenge from the group server 130. The challenge allows the server to discard data that is being replayed and can prevent replay of responses. The challenge also allows for validation that the request comes from a group member. Upon receiving the request, the group server 130 can generate the challenge, and send it to the member B device 119. The member B device 119 then can generate RSVP with an "accept" response that includes a signature of at least a portion of the RSVP using the diversified signing key. The group server 130 can validate the RSVP by using the diversified verification key (e.g., sent in cryptographic blob in step S3) to check the RSVP signature, and accept the RSVP. The group server 130 can then send the RSVP response 133 to the member B device 119.

In step S7, the group server 130 can validate the RSVP (as described above), send the RSVP response, receive a request for the cryptographic blob, and send the cryptographic blob. The request for the cryptographic blob can be preceded by a challenge, e.g., as described for step S6. The member B device 119 can request the cryptographic blob to obtain group member private keys and seeds from the encrypted payload of the cryptographic blob, which can be used to generate group signing key to access the group resources 180. The group server 130 can send the cryptographic blob to the member B device 119 upon receiving the request, if the member is part of the group. In other embodiments, the cryptographic blob can be sent to anyone requesting it, regardless of whether they were in the group or not. In yet another embodiment using a signed challenge, the member can be required to be someone that was invited to the current group, which is different than being in the group.

In step S8, the member B device 119 can then decrypt the encrypted payload of the cryptographic blob using the cryptographic data stored in the RSVP response and the private key for member B device 119. Once the encrypted payload is decrypted, the cryptographic blob can provide at least some of the following: the administrator group private keys, group private keys 114 (e.g., group signing and encryption keys), seeds 115, diversified verification keys, and all of user public keys for all member devices. The member B device 119 can then generate the group signing keys and/or member and administrator encryption/decryption keys using the user public keys and the seeds 115 to access the group resources 180. A seed can be used to generate any number of keys.

B. SPI for Key Distribution

Since the keys are needed for each user, the key distribution server (KDS) can translate each user handles or unique user ID to a unique verification and encrypting pair of keys. Therefore, the KDS can act as an intermediary performing the service of translating user handles to a unique user group identifier and their corresponding public keys.

A couple of example SPIs for the KDS are as follows. The first SPI can use a handle (e.g., email addresses, phone number, etc.) to retrieve a unique user ID, encryption and verification public keys, encryption and verification signatures pair, and metadata. The second SPI can use a unique user ID to retrieve encryption and verification key pair, encryption and verification signatures pair, and metadata.

The SPI calls allow users to be looked up by their handles, which is the identifier that other users will have for them, and then provide consistency in verification of the user using the user ID in future calls. Two keys and two sets of signatures can be returned by both calls. In each case, the user public encryption key can be received, followed by signature of that key by the user's private signing key, the user public verification key, followed by a signature of the user's verification key by the user's private signing key, followed by a set of pairs, and finally metadata about the keys. Each pair consists of a verification key corresponding to a signing key that has signed the user's verification key and a corresponding signature. Such a user of a signature can allow different devices of the same user to validate other devices' keys. Additionally, it can serve to determine that public keys returned by KDS are valid, e.g., KDS did not change the public keys to different keys. Metadata for the user's keys may include information for why there was a change to the keys or related information.

Since KDS can return all historical keys, a user device (e.g., an admin device) learns not only current keys, but previous ones as well, including their period of validity. This can be used to cross-check scenarios where the keys assigned to a user within a previously formed group do not correspond to the currently issued keys. A group member can verify that the keys specified by the group did correspond to the user at the time of group creation. Similarly, the reason for the new key can be explained in the metadata.

The Key Distribution Service (KDS) can ensure that clients are actually capable of decrypting ciphertexts encrypted with the encryption public key that is given to the KDS. Similarly, KDS can ensure that clients can sign messages that can be verified with the verification keys provided. This ensures both that appropriate keys were received, and that the client has the ability to decrypt or sign with the keys they claim to possess.

The KDS scheme can ensure no two users can have the same keys. There may be no record of the contents of the queries made or content of the responses served.

C. Interfaces for Group Services

The group services can provide low-latency high-throughput system that are responsible for maintaining group states. The SPI for group services can provide following functionalities.

A Create New Group SPI can be used to create a new root level group. This function can receive a metadata blob, a group blob, and a verification key for validating a group. This functional can also receive a seed blob. This routine can ensure the current group and authenticated metadata blobs are signed by the current signing key for the group. The output can be a new Group ID, and the server can start a new state chain for the group. This functionality is described more in FIG. 5.

A Process Group Invitation SPI can be used to accept RSVPs to group invitations. A group member can receive an invitation from another group member (directly or indirectly) and then form an RSVP (i.e., an acceptance message) to this invitation, which can be sent to a group server. The group server can store the RSVP, and in the case of an acceptance, logs the RSVP in a queue. This functionality is described more in FIG. 3.

A Group Member Status SPI can be used to attest that a user is from a group, and then passes a RSVP queue (i.e., an acceptance message queue) of the group to the user. The RSVP queue can allow a group member to discern which members of the group that were cryptographically included have accepted the invite, rejected the invite, or asked to leave the group. This functionality is described more in FIG. 9.

An Update Group SPI can be used to input a Group ID, an updated group blob (including new verification key), metadata blob, and seed blob. The blobs can be added to the end of the group blob list (or replace) if the new group blob is signed by the previous group validation key and the new group validation key. This functionality is described more in FIG. 10.

A Get Group Key Blob SPI can be used to take a Group ID and return the group key blob (e.g., group blob) for that Group. This functionality is described more in FIG. 7.

A Destroy Group Request SPI can be used to return a nonce that is valid for a small amount of time on first call the user provides a Group ID. The user then can return a message with "This Group is To be Destroyed" followed by the nonce, and signed by the administrator group validation key. Upon receiving successful message, then the group can be destroyed.

A Create New SubGroup SPI can be used to input a Group ID, a new group blob, and new verification key, and these can be signed by both the new verification key, and the verification key corresponding to the administrative signing key of the previous group blob, where the administrative signing key can be a key available only to the administrators of the group.

A Communication to group admins SPI can be used to input an encrypted message under the group's current administrative encryption key, and a Group ID and metadata can be added to the group queue (e.g., an RSVP queue) for encrypted messages to the group.

A Communication to the Group member can be used to input an encrypted message under the group's current encryption key, and a Group ID and metadata can be added to the group queue (e.g., an RSVP queue) for encrypted messages to the group.

Other interfaces can respectively retrieve member or administrator seed blobs (e.g., using an index to specify range of seed blobs requested), decrypt seed blobs, and store seed blobs.

Because the groups are anonymous, there may be no ability to perform normal access control to access group services. Similarly, group services can serve group data to all requesters (excluding limitations done to prevent nuisance), and logging of the data that is served can be limited, e.g., as that could easily lead to de-anonymization of the groups the service provides.

The key security requirements for group services can be as follows. (1) Any changes to the encrypted group blob or the authenticated data associated with a group blob can only be processed if they are executed by current, authorized group members. (2) No two groups can have the same Group ID. (3) Only appropriate group member can access secret keys. (4) Entire history of some seeds can be available. (5) Ciphertext in a handle is not linkable to recipient's public key by anyone without knowledge of the corresponding secret key.

II. Group Key Exchange (Registration)

A goal of group key exchange is to establish group keys amongst a group of group members. Many keys can be generated for such a group. The group keys can be generated from a root seed (one for administrative needs and one for general group needs) provided in a group (cryptographic) blob, e.g., to limit storage requirements and limit inconsistency issues. Example group properties, elements of a group blob, sequence for creation of a group blob, and seed blobs are now described.

A. Example Group Properties

The initial group can be defined solely by nomination of the group initiator. The group initiator can specify a list of group members in two parts: administrators and general members. All administrators are general members, but the converse need not hold. On group creation, the group creator (initiator) can send directly (e.g., via a messaging service) invites to the other group members. The group members can create RSVPs (acceptance messages) to group services in response to whether they would like to either accept the invitation or reject it. Upon acceptance, group services will reply with an RSVP response (acceptance response) including data that can be used to allow to decrypt the group blob along with user decryption key. An RSVP is a type of message, and references herein to an RSVP can apply equally to general message formats.

Once created, only administrative members of the group can change its membership or initiate key rolling (i.e., updating the group). Key rolling can create new seeds and thus create keys for the group without a membership change. If there was concern about the exposure of a group's previous secret keys or seeds, one might roll the keys. Non-administrators can request a key-roll or membership change. In one aspect, neither regular users nor administrators can drop themselves from a group. For example, a control message can be required to be sent to/from user A to Administrator B to request that Administrator B remove user A from the group, should A desire to be removed. This can be done by having the user send a message (e.g., an RSVP message) to group services asking that an administrator remove them from the group. Administrators can check these RSVP logs before updating groups, removing any members that have requested departure, or rejected invitations to join group. One exception can be to destroy group functionality, which will allow a group administrator to destroy the group, resulting in their own removal (and everyone else's).

Various embodiments can provide the following security properties.

An Authenticated (Group) Key Exchange security property can ensure that assuming no collusion between group members or between a cloud server and group members, only those individuals who are in the group, been invited, and accepted the invitation, can have access to the group keys, and only administrators in the group can have access to administrative group keys.

A Post Compromise Secrecy security property can ensure that if a device is compromised, but later made honest, then secrecy of future keys can be guaranteed.

A Key Contributiveness security property can ensure that even if all but one honest player is compromised, the ability to sway the distribution of keys that result from the protocol execution can be limited.

A Group Continuity and Ownership security property can ensure that only those users selected by the group creator can be there at its creation, and only group members specified as administrators can modify group composition.

A Group Anonymity security property can provide that the group server does not store anything that will expose to a cloud server about who group members are.

B. Group Blob

The system can include identities of groups, each uniquely identified by a unique identifier Group ID. For each group, there can be an authenticated linked-list of group state blobs. These linked lists and associated states can be maintained by the group services servers.

Figure 2A:
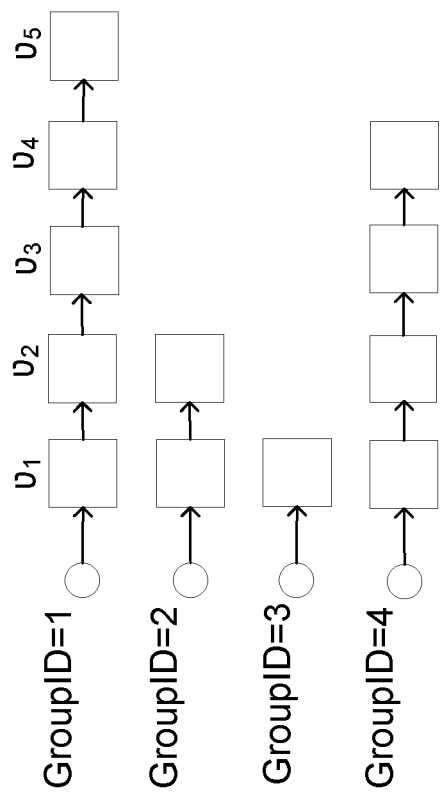
FIG. 2A shows a diagram of different versions for each group.

FIG. 2A shows a flow diagram of different versions for each group. Four different groups with different group IDs are shown in the FIG. 2A. For each group, a set of versions is shown. A group with group ID=1 has five different versions, represented by $v_1$, $v_2$, $v_3$, $v_4$, and $v_5$. A new version can be created whenever an administrator member decides to update the group. For example, the administrator member can change membership of members of the group, and therefore need to update the group to a new version to reflect such changes. A group with group ID=2 has two different versions, a group with group ID=3 has one version, and a group with group ID=4 has four versions.

Each linked list blob can represent an iteration of the group's membership. The data can be signed by keying material in the previous blob that is available only to the administrators of the group as defined in the group's previous head blob. This can ensure that a group is controlled only by group members, and cannot be modified, or added to by a non-group member. In some embodiments, only the last version of the Group Blob is stored. A seed history described below can allow access to the earlier version seeds.

Figure 2B:
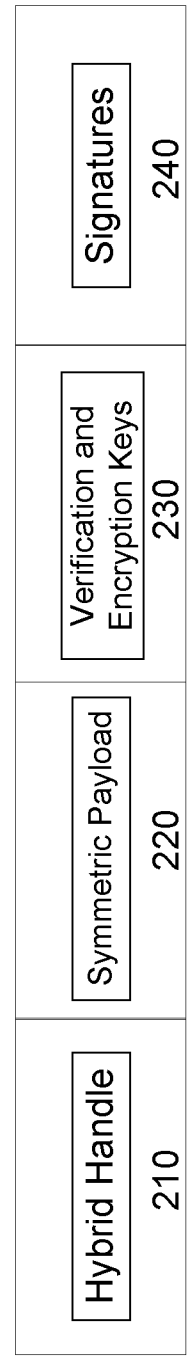
FIG. 2B shows a block diagram of content inside a group blob.

FIG. 2B shows a block diagram of contents inside a group blob 200. The group blob can contain several parts. A hybrid handle 210 can include a public-key encryption handle for each member. A symmetric payload 220 can be generated by a symmetric key encryption. Public verification and encryption keys 230 are included so group services and non-group members can validate information from and encryption information to the group. Group blob 200 can also include signatures 240 that can validate the blob's consistency. Group blob 200 can include a unique group identifier (group ID) from the group server 306.

Prior to forming the group blob, the group originator can check whether the user public keys (e.g., obtained from KDS with user IDs) are valid. For example, the group originator can verify the public keys of the member devices using corresponding signatures.

1. Hybrid Handle

The hybrid handle (also referred to as an encrypted header) can contain separate encrypted parts for each invitee, each encrypted with a respective user encryption (public) key or a key derived from the user encryption key. Each encrypted part includes an encryption of the obscured key ku_i, which is generated from the random key offset Ko_i and a symmetric key K. The obscuring can be done in various ways, e.g., via secret sharing or by blinding, such as with an invertible function. For example, the obscured key can be derived by performing an invertible function (e.g., XOR or adding) of the symmetric key K and the random key offset (from RSVP response) to create the obscured key ku_i. Thus, the user can decrypt the corresponding part of the hybrid handle using the user's secret decryption key to retrieve Ku_i. The user can then apply the random key offset ko_i (obtained from RSVP response) to the obscured key ku_i obtain the symmetric key K, which can then be used to decrypt the payload. If the user has not retrieved Ko_i by RSVPing, then ku_i is information theoretically unattached to K, and so the user has no knowledge of how to decrypt the payload. However, if they have Ko_i, then they use that knowledge to generate K=ko_o (xor/+)ku_i. Using K, they can then decrypt the payload.

2. Symmetric Payload

The payload is encrypted with the symmetric key K that is chosen randomly. For each user, a key offset Ko_i is chosen at random of the same length as the symmetric key K. In the handle, the user i's public encryption key is used to encrypt the value Ko_i(xor/+)K=ku_i.

The symmetric payload when decrypted can contain a number of pieces of information about the group. It is desirable for such information to only be available to others in the group, and thus such information can be encrypted. For example, a list of users can be included so a member knows who else is in the group. Since anonymity of the users is desired, such a list is encrypted.

The symmetric payload can contain pieces of information that are encrypted using the symmetric key K. Example pieces of information can include a list of users, a list of the individual encryption and verification keys for the users of the group, the role of each person in the group (administrator, or member), the seeds that are used to generate the current group keys, a recursive version of the group blob that contains a group handle and key seeds for administrators of the group (which is used by admin members), and key offset information that is used to enable invitation acceptance via RSVP.

As for the key offset information, when the group is updated, the next version of the payload can be encrypted with a new key. The key offset information is used to ensure the hybrid handle encrypts keys that, when combined with the key offset, allows the users to decrypt and reconstruct the appropriate new payload key. As the symmetric payload can be encrypted using the symmetric key K, in order to access the key pieces of information, the user can obtain the symmetric key as described above. The seeds can be randomly generated. The originator can generate two different seeds, member and administrator. Previous seeds can be stored in a seed blob. The "recursive version" for administrators can include the same information but just for the administrators; a separate hybrid handle, encrypted payload, and separate key offsets would exist for the administrators. A separate symmetric key can be used to encrypt the administrator's encrypted payload.

3. Verification and Encryption Keys

A third part of the blob can includes group keys, including (i) a group signature verification key that all group members have access to the corresponding signing key, (ii) a group public encryption key that all group members have access to the corresponding decryption key, (iii) an admin signature verification key that only current administrative members have access to the corresponding signing key, and (iv) an admin public encryption key that only current administrative members have access to the corresponding decryption key.

The signature verification key for all group members can be generated by performing a cryptographic hash (e.g., SHA-256) of all group members' public keys (verification and encryption keys) to generate a key digest. The key digest can then be used with the member seed to generate group signing and verification keys for all group members and he public encryption key and private decryption key for all group members. The signing key and signature verification key for administrative members and the public encryption key and the decryption key for administrative members can be generated in similar ways with administrative keys using the administrator seed, but can only use only administrative members' public keys. The private keys (signing key and decryption key) of the members would be stored in the encrypted payload of the members, and the private keys of the administrators can be stored in the recursive version of the group blob for administrators. The originator (or administrator) can generate both the group public and private keys as part of the same operation. The group private keys may or may not be included in the encrypted payload of the blob, e.g., the group private keys can be derived from the seed(s). In addition, the symmetric key (for hybrid handle), the administrator symmetric key (for administrator's hybrid handle), an administrative symmetric seed blob key (for administrative seed blob), a member symmetric seed blob key (for member seed blob), an administrative root seed key, and a member root seed key can be generated in similar ways.

The private keys and public keys can be generated at the same time. In other cases, the private keys can be generated initially, and later the public keys can be derived from the private keys. This holds for both decryption (private)/encryption(public), and signing(private) and verification (public) keys.

4. Signatures

The group originator or updater admin can sign the current blob (minus any signatures) using the group administrative signing key to generate a current group blob signature. The group originator can additionally sign the current blob (minus only this signature) with a previous version of the group administrative key to generate a previous group blob signature. The current group blob signature can be used by the member and/or the group server to validate the group blob received by the group server. The group server can validate that the new blob is coming from an administrator of the current group. The previous group blob signature can be used to verify that the current group blob is created/updated by an administrator member of a previous version of the group blob. The members can validate that the new blob is a legitimate descendant of their current version of the blob by validating that the seed blob chain (described more below) is consistent with the current group blob.

C. Invite

The group originator (or more generally an administrator, e.g., for an update) can create a diversified verification key for each user, using a diversifying factor (e.g., a blinding factor and also called a diversifier) and the public verification key of the user. The diversifying factor can be unique for each user. This diversified verification key can allow a device to be verified as an invited device but not allow the group server to determine the identity of the user. The diversifying factor can be used to maintain privacy of the users and can be used in coordination with invite acceptance/rejection. If invite acceptance/rejection is not needed in an embodiment, the diversifying factor could be removed. In such cases, the diversifying factor can be used for sending messages within the group, e.g., to validate a user is in the group, thereby providing nonrepudiation.

The group originator can create an invite message comprising the diversified verification key, the diversifying factor, any metadata as needed, an RSVP response digest (described more in other sections), and the group ID. The invite message can then be encrypted using the user public encryption key of the particular user being invited. The user device can combine the diversifying factor and the signing key of the user to generate a diversified signing key, which allows the user device to authenticate itself to the server, without exposing its identity; the diversification covers the identity. The server can use the diversified verification key (included in group blob) to verify the user is a member in the group, e.g., by verifying a signature of a message, where the signature is generated using the diversified signing key. The diversifying factor allows the device to confirm the validity of the diversified verification key. The diversified verification key is included for quality assurance and debugging, but is not necessary. For example, the user can take the diversifier and their signing key and reconstruct the diversified public key.

D. RSVP Response

The group originator can create an RSVP response including a random key offset $ko_i$ (referred to as random cryptographic data or just cryptographic data) and potentially the diversified verification key, e.g., for verification. The random key offset can be unique to a particular RSVP response, and thus unique to a particular member device. The random key offset can be used by the originator to obscure a symmetric key K, which can be used to encrypt an encrypted payload of the group blob. The RSVP response can be provided later to an invited device (after verification using the diversified verification key) so the invited device can retrieve the random key offset, which can be used to de-offset an obscured (offset) symmetric key to obtain the symmetric key K, which can be used to decrypt the encrypted payload of the group blob. The group originator may also perform a cryptographic hash of the RSVP response (e.g., SHA-256) to create a RSVP response digest (e.g., a hash), which may be used later by a user who receives an invite to make sure that the RSVP response they receive is correct. The RSVP response is provided to a member at time of accepting an invite to the server.

E. Sequence for Invitation Acceptance

When a user wishes to create a group, they will request from group services an unused group ID, which can be a unique identifier of a group. The administrator creating the group can create a group blob with the Create Group functionality. Such a blob would be the first group blob in a linked list (See FIG. 2A). Two other sets of blobs, invitations and RSVP responses (also called acceptance responses), can be created. The invitations are unique to each user (or user device), as are the RSVP responses. The invitations can contain a diversifier for the invited user's signing key, which corresponds to a verification key; both keys can be diversified as described herein. The RSVP responses can contain cryptographic data (e.g., a key offset) to be applied to the obscured key in the hybrid handle to obtain the symmetric key used to decrypt the symmetric payload of the blob. Each RSVP response can include different cryptographic data, and each component of the hybrid handle includes a different obscured key that is specific to the user. The cryptographic data can be encrypted by a public key of the member the invitation will be sent to, such that when the member receives the RSVP response, the member can decrypt the encrypted cryptographic data to access the cryptographic data.

The administrator can deliver the group blob and RSVP responses to the Group Services server. The group server can validate the signature on the group blob, and the RSVP responses. Once received and confirmed by group server, the administrator can send the invites (e.g., via a messaging platform) to the appropriate users (and their devices).

Upon receipt of the invites, the user can determine if they wish to accept or reject the invitation. The user can send an RSVP (acceptance message) to the invite to the group server. The RSVP can include a non-encrypted field, which states if the invitation is being accepted, or rejected, and a signature. The signature can be created using a diversified signing key generated from the user signing key and the diversifier contained in the invitation. An RSVP (or other message) can also indicate departure, which is used later to denote a member of the group who has decided to leave. If the user has accepted the invite, the user will store the invite locally for future use in a secure store (as it has keying material in it).

The user can send the RSVP to group server, as an invitation response. Group server can ensure that the RSVP is signed by one of the diversified verification keys in the current group blob for the corresponding Group ID. If it is not, the RSVP will be rejected. If it is validated, group server can add the invitation to the RSVP queue. Group server can send back to the user the RSVP response that corresponds to the same diversified verification key that was included in the user's RSVP and the encrypted cryptographic data. The user can decrypt the encrypted cryptographic data and retrieve the cryptographic data (e.g., key offset) necessary to generate a symmetric key to decrypt the encrypted payload of the group blob.

The user can now request the latest version of the group by requesting its group ID, and retrieve it. Along with its own keying material and the cryptographic data retrieved from the hybrid handle in the key blob, the user can now generate the symmetric key and decrypt the encrypted payload of the group blob. Retrieval of group blob may require signature with diversified key.

Figure 3:
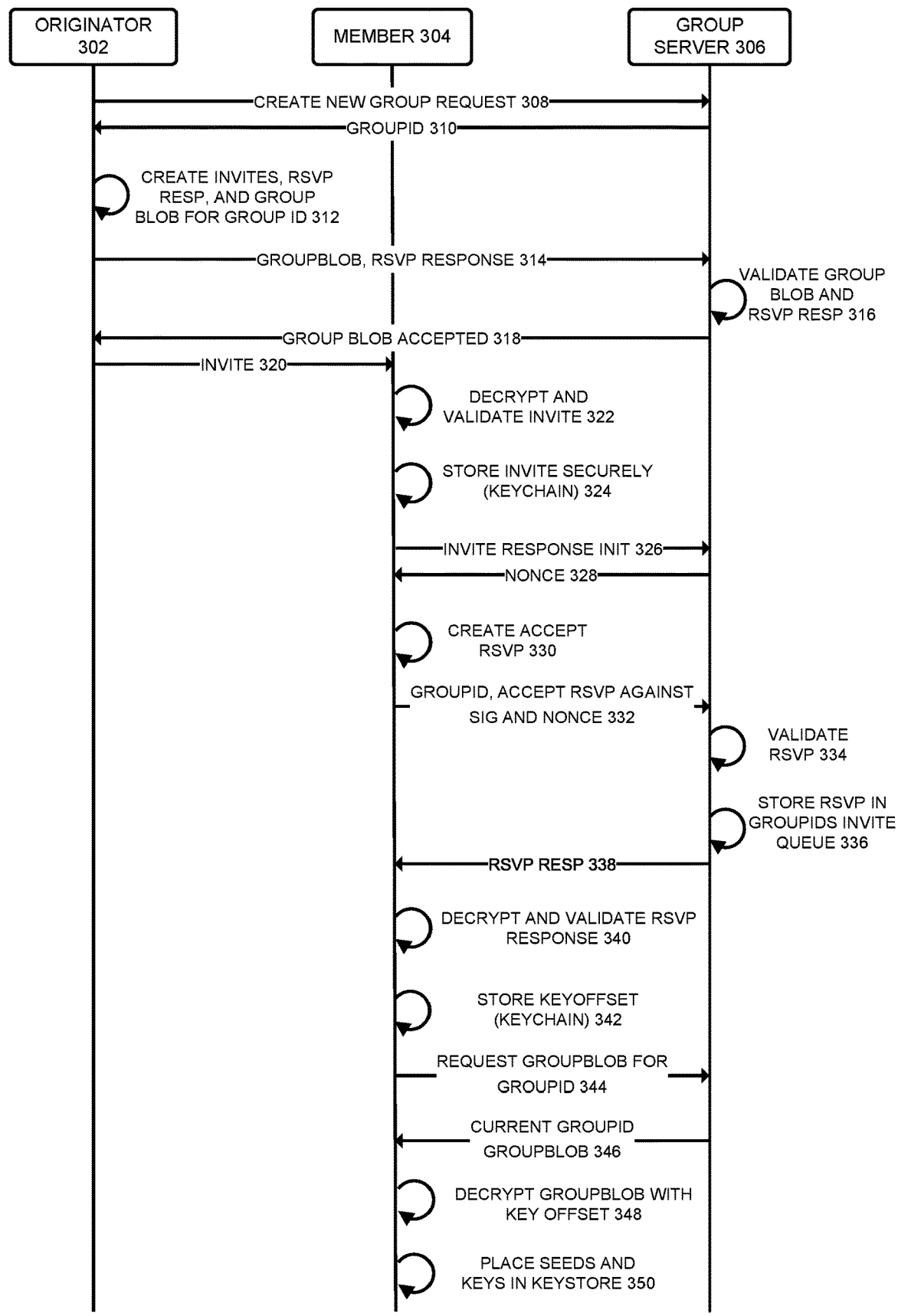
FIG. 3 shows a flow diagram of a flow for group invitation acceptance.

FIG. 3 shows a flow for group invitation acceptance. A group originator 302 (an administrator) can send invites to other members such as a member 304 (i.e., member device) to join a group, in which the users can accept them, join the group, and obtain group keys, all without providing their identities to a group server 306.

Prior to forming the group, the users (member 304 and the group originator 302) may generate two key pairs: signing/verification key pair and encryption/decryption key pair. The member 304 and the group originator 302 can register the public keys (verification key and the encryption key) with a key distribution server (KDS) using handles/identifiers (e.g., a phone number, email, password, user ID, etc.), along with an encryption key signature (generated by signing the encryption key with the signing key) and a verification key signature (generated by signing the verification key with the signing key). The KDS can validate that the verification key provided was signed by the user, and that the user can agree that this key pair is for grouping (i.e., the encryption key was not provided by a third party).

The private keys (signing and decryption) are only known by the users themselves (i.e., user devices). For example, if there are 10 users, then there can be 10 user verification keys, 10 user encryption keys, 10 encryption key signatures, and 10 verification key signatures registered to the KDS, each for a respective user. Additionally, prior to forming the group, the group originator 302 can obtain the handles (identifiers) of each user of the group, as well as public keys and signatures of each user, from the KDS or directly from the users. The KDS can also store unique group user IDs for each member in a group. These group UIDs can be generated by the group server when a member is authenticated via an RSVP and provided to the KDS.

The originator 302 can manage the delivery/generation of group keys to only particular members that are invited and accept the invite. A group server 306 can receive a group blob (including group keys and/or seeds to generate the group keys) from the originator 302 and provide the group blob to members that accept the invitation. Identities of the members can be masked using blinded (diversified) public keys, which are in the group blob and allow authentication without compromising identities of the members. The group originator 302 (or other administrator) can verify each user's public keys by checking the corresponding signatures when creating (or updating) the group blob.

In step 308, the group originator 302 can send a request to create a new group to the group server 306. The group originator 302 can already have public keys of the members, e.g., from the KDS or from previous interaction with the member.

In step 310, the group server 306 can generate a new group identifier (ID) and send the group ID to the group originator 302. The group identifier can be generated randomly (but still unique) or in sequential order.

In step 312, the group originator 302 can create invites, RSVP responses, and a group blob for the group. The invites are for the other members, and the RSVP responses and the group blob are sent to the group server 306. Each RSVP response corresponds to an invite that is specific to a particular member (user) invited to the group.

In step 314, the group originator 302 can send the group blob and the RSVP responses to the group server 306.

In step 316, the group server 306 can validate the group blob and the RSVP responses. The group server 306 can check that the group blob is consistent to the degree the group server 306 can verify. One way to perform the check is by making sure that the group blob parses correctly. For example, it can be determined that the group blob passes basic data consistency checks. Keys look like keys, same number of diversified verification keys as encryptions in the handle, that encoding format is satisfied, etc. Another way is by verifying the current group signature is correct by using the group verification key. The group server 306 has version i of the group, which has its version i administrative group verification key (non-encrypted). When a proposed version i+1 of the group is generated, the admin signs the new blob (vers. i+1) with version i's signing key. Only admins in version i have this key, so the sever will validate with version i group signature and be assured that the update is coming from a current administrator of the group.

Upon checking that the group blob is valid, the group server can verify the RSVP responses. The group server can verify that the diversified verification keys of the RSVP responses are in the group blob. It can be verified that there is an RSVP response for each diversified verification key (VK). If the blob is an update blob (and not a creation blob), then it can be determined there is a RSVP response for each new diversified VK.

In step 318, upon validating the group blob and the RSVP responses, the group server 306 can notify the group originator 302 that the group blob and the RSVP response have been accepted.

In step 320, the group originator 302 can send an invite to the member 304. The invite can be encrypted using the member's public encryption key. The invite can be sent via any suitable communication means, e.g., as a result of the encryption. Standard TLS (transport layer security) encryption can be used.

In step 322, the member 304 can decrypt the invite using the member's private decryption key. Upon decrypting the invite, the member (i.e., the user device) can obtain any information in the invite message, e.g., the diversified verification key, diversifying factor, any metadata, the RSVP response digest, and the group ID. The member 304 can validate the invite using the diversifying factor with the user verification key to generate a diversified verification key. If the diversified verification key of the member matches with the diversified verification key of the invite message, then the invite can be validated In step 324, the member can then store the invite securely in a secure store (e.g., a key storage of the group server 306) under the Group ID label. The secure store can be protected by a biometric or password of the user.

In step 326, the member can send a notification to the group server that the member received the invite from the group originator and requests a challenge (e.g., a nonce). This nonce can be valid for only a short time. The nonce can allow the group server 306 to discard data that is being replayed and prevent replay of responses.

In step 328, upon receiving the notification that the member received the invite, the group server 306 can randomly generate a nonce and send the nonce to the member 304.

In step 330, the member 304, using the nonce, can create an RSVP (acceptance message) with "accept" in the response. Member 304 can create a diversified signing key using the diversifying factor and the user's signing key. The member 304 can sign the RSVP message, e.g., including some or all of a status of the member (accept, reject, leave), group ID, nonce, and the diversified verification key using the member's diversified signing key to generate an RSVP signature In step 332, the member can send the RSVP message and the RSVP signature to the group server 306.

In step 334, the group server 306 can validate the RSVP message, e.g., using the member's diversified verification key as the RSVP message can be signed using the member's diversified signing key. The group server can confirm that the member 304 accepted the invite, that the nonce in the RSVP matches with the nonce sent by the group server, and that the randomized verification key is in the group blob. If they all match, then the RSVP is validated.

In step 336, upon validation, the group server 306 can store RSVP message in an RSVP queue. Group members can query the invite (RSVP) queue to know which members listed in the group blob have accepted the invite, rejected the invite, or simply have not responded. If the group is being updated, those that have rejected the invite can be removed from the group blob.

In step 338, the group server then can send the RSVP response to the member 304. The group server can use an encrypted TLS connection between the client and server, as can be used for all connections described herein. The RSVP response can have an encrypted portion for the recipient, which was encrypted by the admin who added them to the group and made their invite. The RSVP response can be encrypted using the same user public encryption key as the corresponding invite.

In step 340, the member 304 can validate and decrypt the encrypted RSVP response using the member's private decryption key The RSVP response can be input to a cryptographic hash function to obtain a RSVP response digest. The RSVP response digest determined by the member 304 can be compared with a RSVP response digest of the invite message, and if they match, the member 304 can validate RSVP response. The diversified verification key of the RSVP response (if one is included) can be also compared with the diversified verification key of the invite message to see if they match. If there is a match, the RSVP response can be validated. Once the RSVP response is validated, the member 304 can use the member's decryption key to decrypt the encrypted RSVP response to obtain the cryptograph data (e.g., a random key offset), which can be combined with ku_i to obtain the symmetric K used to decrypt the symmetric payload in the group blob.

In step 342, the member 304 can then store the cryptograph data in a secure storage, e.g., that is dedicated for storing keys.

In step 344, the member 304 then can request the group blob for group ID to the group server 306. The request can occur at the same time as the request for the RSVP response.

In step 346, the group server 306 can send the group blob of the current version to the member 304.

In step 348, the member 304 can decrypt the group blob handle using the member's private decryption key to obtain an obscured key. The member 304 can apply the invertible function (e.g., XOR or add in a field of order 2) to the cryptograph data and the obscured key to obtain a symmetric key. The symmetric key is then used to decrypt the symmetric payload to obtain key information including the seeds and/or the group keys.

In step 350, upon decrypting the payload, the member 304 can place the seeds and the group public keys in Keystore (key store memory). The private group keys can be included in the payload or derived from the seed(s). In some implementations, the users can take the initial seeds and the public keys of the other users in the group and use them to derive a second seed; all the group keys for this version of the group can be derived from the second seed.

In various embodiments, embodiments can achieve various properties, such as: (1) The user does not get group keying material without accepting an invite to the group; (2) Group services does not need to process an invitation for every request of the group blob; and (3) The invitation responses are anonymous.

F. Seed Blobs

Seeds blobs can be used to avoid group blobs as depicted previously (in FIG. 2A) from growing arbitrarily large over time due to the need to include all previous seeds. Complications could also arise due to the need to determine a policy on how many previously group blobs to maintain for a given chain.

In some embodiments, a seed blob can include an authenticated encryption of the seed and the role denoting admin seed blob or member seed blob. On upload, a seed blob can include a signature to validate that the seed blob is coming from an administrator of the group. This signature need not be maintained by the server once the seed blob has been successfully verified In some implementations, rather than the history of all seeds being stored in the group blobs themselves, the current blob can only store the current version of the seeds. However, a member device can derive a key based on its current seed to decrypt and authenticate a seed blob, which contains the previous blob's seed, which itself will be usable to decrypt and authenticate a seed blob of the previous seeds key, recursively until a seed blob with the original key of the group is reached.

Each group blob can have two seed blobs: an administrator seed blob and a member seed blob. The administrator seed blob can contain group ID, version number, role (administrator), previous group blob's administrator seed, and previous group blob's key hash. The administrators seed blob can be encrypted using an administrator symmetric seed blob key. The member seed blob can contain group ID, version number, role (member), previous group blob's member seed, and previous group blob's key hash. The member seed blob can be encrypted using a member symmetric seed blob key.

Figure 4B:
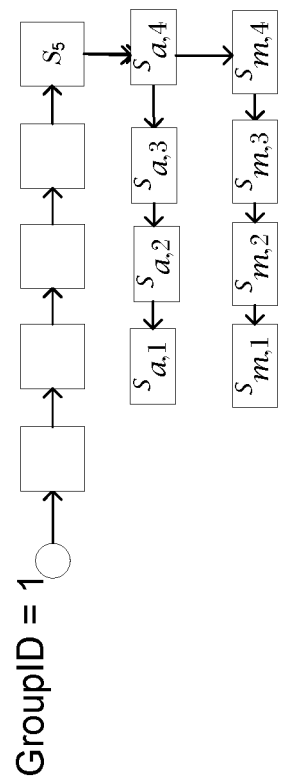
FIG. 4B shows a diagram of a group blob storing both administrator and member seed blobs.
Figure 4A:
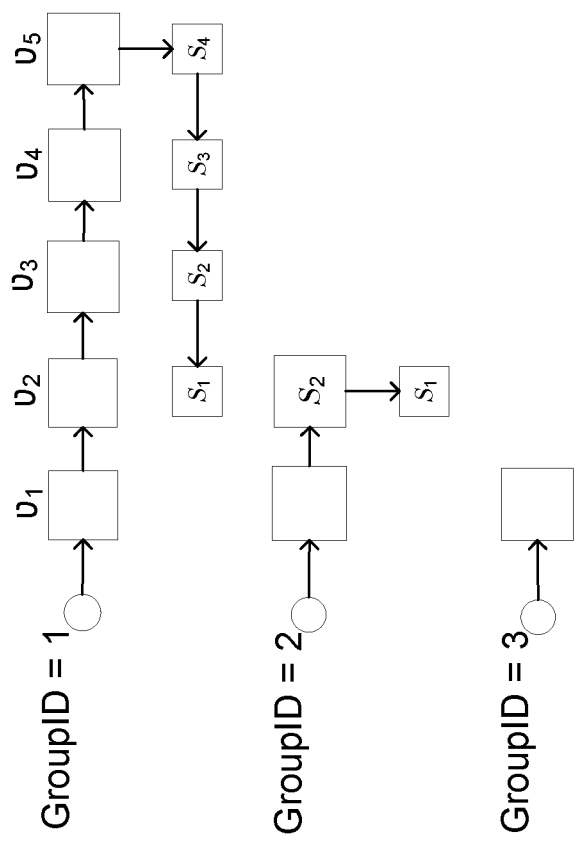
FIG. 4A shows a diagram of group blobs storing seed blobs.
Figure 4A:
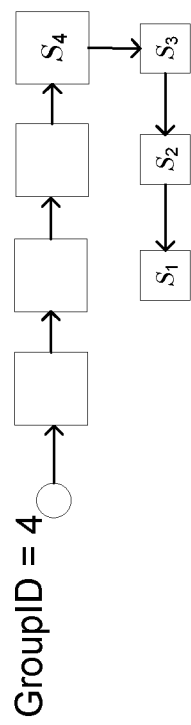

FIG. 4A shows a diagram of group blobs storing seed blobs. For each group, a set of versions is shown. A group with group ID=1 has five different group blob versions, represented by $v_1$, $v_2$, $v_3$, $v_4$, and $v_5$, and four different seed blob versions, represented by $v_2$, $v_3$, $v_4$, and $v_5$. Each group blob has a corresponding seed blob that has a previous group blob's seed. For example, in group ID=1, a seed blob vs has a seed $S_4$. The group blob $v_1$ does not have a corresponding seed blob as there is no previous group blob. Each group blob version can additionally store its own seed version. For example, in group ID=2, the group blob $v_2$ has seed $s_2$. A group with group ID=3 has one group blob version and a group with group ID=4 has four group blob versions and three seed blobs.

When a group is updated, and thus a new group blob is generated, an admin device can simultaneously generate a seed blob to contain the seed of the previous group blob. This seed blob can be encrypted with a symmetric key derived from the seed in the new group blob (seed blob symmetric key). Each version of a seed blob can be used to access a previous seed blob, and thus obtain any key necessary to access group resources for a previous version of the group. There can be two seeds in each group blob, an administrative seed and a member seed. Thus, there can be two chains of seeds, one for members and one for admins, as shown in FIG. 4B.

FIG. 4B shows a flow diagram of a group blob storing both administrator and member seed blobs. A group with group ID=1 has five different group blob versions, four different administrator seed blob versions, and four different member seed blob versions. Each group blob has corresponding admin and member seed blobs that has a previous group blob's seeds. For example, an admin seed blob $v_5$ has an admin seed $s_{a4}$ and a member seed blob $v_5$ has a member seed $S_{m4}$. Each group blob version can additionally store its own seed version. For example, a group blob version $v_5$ has seed $s_5$ (has both admin seed say and member seed $S_{m5}$).

When an admin or user goes to update their group blob, they can only retrieve the latest group blob, possibly skipping several in between, and all of the seed blobs between their current group version and the latest group version. The client can then decrypt all the seed blobs until the last where they need to verify that they are decrypting the seed in the group blob they were updating. This verification can validate that whomever updated the group had access to the seed in the current group. Anyone with this member seed/administrator seed can extend the group.

G. Example Cryptographic Techniques

Seeds that are used by an administrator to generate group keys can be of size 512 bits, or 64 bytes, for example. Key derivation functions, or random oracles, that are used alongside the seed to generate group keys can be done using HKDF (HMAC based extract and expand key derivation function). Signatures generated by using signing keys (both group and user) can be done using elliptic curve digital signature algorithm (ECDSA) over 256-bit prime field Weierstrass elliptic function (p-256). The signatures can be of length 72 bytes. Signing key can be of length 64 bytes uncompressed and 33 bytes compressed. Keys here can use compact representation at 32 bytes.

As examples, authenticated encryption (AE), or authenticated encryption with associated data (AEAD), can be done using AES-GCM with a 256 bit key (32 Bytes), and a 96 bit (12 Bytes). Public key group blob handle encryption can be done over P256. Key length can be 64 bytes uncompressed and 33 bytes compressed. Keys can use compact representation at 32 bytes. Public key encryption can be done using HPKE.

III. Spi Functions for Client and Group Key Exchange

In order to achieve cryptographic operations (such as Create New Group, Process Group Invitation, Group Member Status, Update Group, Get Group Key Blob, and Destroy Group Request discussed above), certain functions/methods can be implemented to support the cryptographic SPIs.

A. Validating User Keys

The Validate User Keys function can ensure that all of the keys returned by the KDS are properly signed. In some embodiments, when multiple devices are supported, this function can ensure that all keys for a given user are co-signed by creating a graph of keys per user, putting a directed edge between one key signed by another, and verifying bidirectional connectivity of the graph (i.e., finite diameter).

B. Generate Group Keys and Seeds

The Generate Group Key Seeds function can provide a random seed for each name (admin or member) given as its input. This function can be used when creating/updating a new group blob, and an administrator is creating a new seed blob for both administrators and members.

The Generate Group Keys function can provide a way to generate different keys a group may need from a given seed. The group can derive keys from two seeds per group (one for the admin group, and one for the general membership). Deriving the keys can allow space to be saved, as keys do not need to be retained indefinitely within the group. The function can generate encryption, signing and symmetric keys. By specifying a list of names and types, the caller can be sure to generate keys from the seed in a manner that the keys can be reconstructed in the future.

C. Group Blob Handles

The Generate Group Blob Handle function can be used to generate the hybrid handle of both the group blob, and the administrative blob contained within the group blob's symmetric payload. It can input a random element $y \in Z_{p256}$, where p256 is the order of the p256 curve. The keys of all the users/devices of users that are in the group and key offsets for each individual/device that has been invited to the group can be used as inputs to the function. The key offsets can be embedded in the invitations to group members.

The Decrypt Group Blob Handle function can be used to decrypt the hybrid handle of both the group blob, and the administrative blob contained within the group blob's symmetric payload. The input is the blob handle, and the user's decryption key, along with appropriate associated data. The function can require the caller of the function to externally perform an invertible function (add or XOR) on any key offsets to the returned key to obtain the symmetric key, if it is being used in the GroupBlob.

The Verify Group Blob Handle function can be used to verify that the entire group handle was properly encrypted. The function can allow a user that has decrypted a group or administrative blob to ensure that other group members or administrators would be able to decrypt the same group. The function can ensure that everyone in the group that is believed to have access, actually does, and validate its correctness. The function can require the keys of the users (retrieved from the group/admin blob), and the key offsets used for the group blob (retrieved from the group blob).

D. Membership Verifiers and Invites

The Create Membership Verifiers function can be used to take the verification keys of the different members of a group, and provide randomized versions of these verification keys, along with the diversifiers necessary to transform secret-keys for the original signing-keys to verify with respect to the new randomized version of the verification key. These randomized verification keys (e.g., diversified verification keys) can be attached to group blobs to allow for group members to anonymously prove membership in the group by attaching the randomized verifications keys to the group-blob. The diversifying factors can be transmitted to individuals/devices as part of the group invitation process.

The Create Invites function can generate a series of invitations and corresponding RSVP Responses for the Group Sever and for the users that are invited to a group. This function can be preceded by a call to CreateMembershipVerifiers function to create the appropriately randomized verification keys for the user. Each invite can be embedded into it the diversifier for that user/devices signing key, to allow them to sign to their corresponding randomized verification key that will be embedded in the group blob. Each invite can have a corresponding RSVP response, which includes a random key offset value that can perform an invertible function (XOR or add) to the symmetric key in the devices/users corresponding portion of the hybrid encryption handle. This can ensure that a user without access to the RSVP Response cannot decrypt the main payload of a group blob, and allow the Group Server to provide access control to group access based on a legitimate invite acceptance (the group server cannot provide an RSVP Response for invite rejections). The RSVP Response's digest can be included in the invite, so that the invitee can be assured the RSVP Response they will decrypt is the one appropriately crafted for them, and appropriate to the given Group ID.

In some embodiments, key offsets can be consistent across a user's devices so that if one device accepts, it can transmit the key offset to its other devices directly (e.g., via a messaging service), and all devices does not need to accept group invites individually.

The Decrypt Invite function can have an invitee to decrypt an invite that has been sent to it. The decryption can allow the invitee to retrieve the inviter's identity encoded in the invite, retrieve that inviter's verification key from KDS, and validate the invite with a call to Validate Invite function.

The Validate Invite function can have a user to validate that the invite is legitimately produced by the sender, and that the diversifier contained in it can produce the expected randomized verification key. This call can be made before any invite is responded to.

The RSVP To Invite function can craft an RSVP that can be sent to the Group Sever, to accept, reject or leave a group. In the case of an accept, the client can expect to receive an RSVP response as a reply. This value can be needed when trying to retrieve information from a group blob.

E. Create Groups and Seeds

The Create Group function can create a group blob to be added as the first blob for Group Services in a new group. The assumption can be that the caller has a list of users that can compose the group, that it knows which users can be administrators, and that it has queried the users keys from KDS. Also, it can further be assumed that the caller has already called Group Services and retrieved the new groups Group ID. The result can be the group blob, the groups keying material, invitations, and RSVP Responses. The Group ID and the RSVP responses can be sent up to the Group Server. The group creator can simultaneously initiate an acceptance of the invitation of the group it created by computing an RSVP response.

The implementation of Create Group function can rest on the generic Update Group function, as the Create Group function is a special case of Update Group function. Further note, the same signing key is passed twice to Update Group function as when creating a group, the signature that is supposed to be from the administrative key of the previous version of the group can be disregarded.

The Create Seed Blob function and Open Seed Blob function can create and open the respective member and administrative seed blobs that store previous seeds of the group, and administrative group. The Create Seed Blob function can create an authenticated encryption of the seed, and sign it with the current administrative Signing key. The Open Seed Blob function can decrypt the encrypted seed. A Validate Seed Blob function can be used to validate the signature of the seed blob.

F. Retrieve Previous Group Information

Retrieve Group Membership function can be the first part in a two-part call to decrypt a group blob and retrieve its resulting keying and state information. This call can return the group membership list, their roles, and state that is meant to be passed along to a subsequent call to Retrieve Group Keys And State function, which can retrieve the group keying information. These can be split into two functions to validate the keying information for the users in the group is consistent with the information used to form the group. However, in order for the caller to get such information, the caller may need to query the KDS, and may need to know who is in the group.

In some embodiments, the key comparison can be a simple equality check, as underlying keys do not roll, and there can be no additions or deletions without account removals. In the case where account removals exist, the assumption can be that KDS will continue to vend the keys, possibly with metadata denoting that the account has been deleted.

If the caller needs to know anything more than a group's membership and role composition, it can immediately use the retrieved user list to call KDS, retrieve the current keys of the group membership list, and then call Retrieve Group Keys And State function with the appropriate information.

The Retrieve Group Keys And State function can take the current keying information from a call to KDS and combine it with previous group information to retrieve the current group's keys. For group members who are not administrators, group membership can mean being able to retrieve the keys associated with the group from this call.

The Authenticate Via Seed Blobs function can provide a verification if the updated group is linked to the previous group, by verifying seed blobs back to the point where it should be retrieving the currently known seed and key-hash. In addition to reporting on whether or not the authentication succeeds, the function can provide any seeds between the current version and the updated version of the blob, so they can be stored.

G. Update Group

The Update Group function can update the current group state, by producing a new group blob that can be sent to the Group Services system as a new head of a given Group ID chain. It can also produce two new SeedBlobs (administrative and Member) that can be sent to the Group Services system.

First the admin can retrieve the current head of the group from Group Services and then via a Retrieve Group Membership function, it retrieves the User List, and Roles, and Group Blob Retrieval State. Next the admin can retrieve the Keying information for the users in the group via a query to Key Distribution Services (KDS) on the list of users in the group. Next, the admin can call Retrieve Group Keys And State function and retrieve the group and administrators keying information for this version of the blob.

In particular, at this point the admin can have user ID (U), role (R), key (K) from KDS and diversified verification keys for the current users. The admin can then call group services with a signed request for the current status of the "invite status queue". This invite queue can work on the basis that any accepts override previous rejects or "leave group" messages. So only the most recent message can matter for each user. However, for any users/admins that have currently signaled reject or leave group, then their information can be removed from U, R, K from KDS and diversified verification key(s) respectively. Similarly, the admin can remove any users/admins that the admin intend to remove from the group in a similar manner by updating U,R,K from KDS and diversified verification key(s).

For new users that the admin wishes to add, the admin can retrieve their keys from the KDS, and can create diversified verification keys for these new users via a call to Create Membership Verifiers function. The admin can then call Create Invites function to create invites to the group for the new users. Lastly they can union their new users into the list of users they currently have resulting in a completely updated set of U, R, K from KDS and the diversified verification keys.

At this point the admin can call Update Group function, and construct a new group blob and receive its corresponding secret keys. The admin can send the blob to the group services module with the plan of adding it to the chain on the Group ID. If the group server replies that this is successful, then the administrator can at this point delete any corresponding invitations in the queue that correspond to users removed from the group blob.

IV. Example Flows for Group Services

Various functionalities can be provided by the group services. Example functionalities can include group creation, sending invites, retrieving a group blob, retrieving seed blobs, requesting group member status, and group update.

A. Group Creation

Aspects of about group creation were discussed above, e.g., regarding steps between the originator and the group server. The originator, or a user, may decide to create a group that can possess resources. Before inviting other members or member devices to the group, the originator need the group server to accept and validate the group creation, e.g., validating group blob and RSVP responses. Further details are provided below, e.g., for the originator creating its own RSVP.

Figure 5:
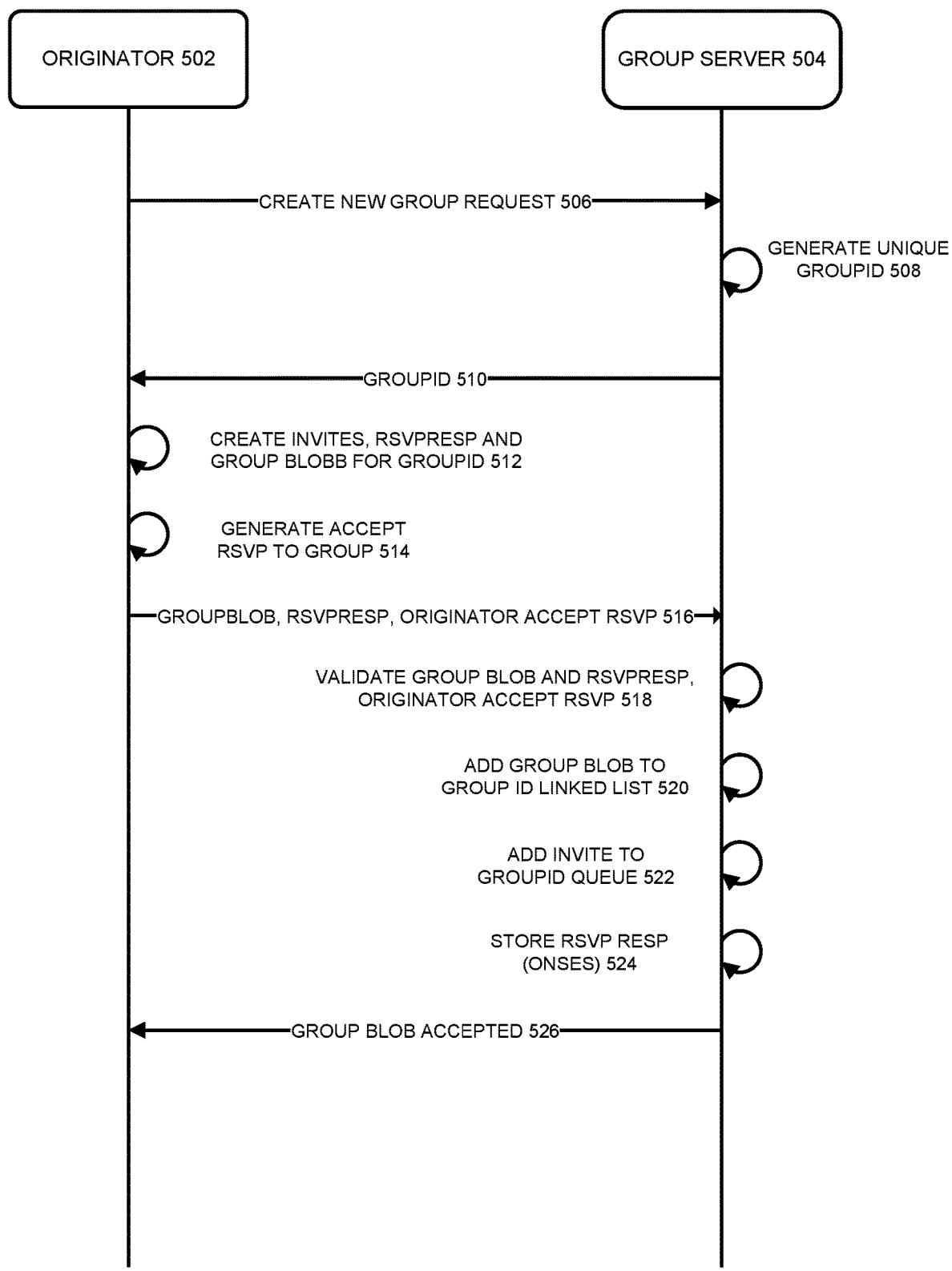
FIG. 5 shows a flow diagram of a flow for group creation.

FIG. 5 shows a flow diagram of a flow for group creation. An originator 502 can decide to create a new group. The group can have a unique group ID (also referred to as GUID) generated by a group server 504, and the originator 502 can get its own invites, rsvp responses and a group blob validated by the group server 504.

Steps 506-512 can be similar to steps 308-312 of FIG. 3. When determining the group ID in step 508, a function Generate GUID can be used for generating random new group identifiers for the Group ID. The random selection can sufficiently reduce the odds of a collision.

In step 514, the originator 502 can generate an RSVP that includes an acceptance. Although originator 502 does not get an invite (since it is the device creating the group), originator 502 can still send an RSVP so that group server 504 knows originator 502 is part of the group. The RSCP can be sent to the group server 504 to essentially accept an invite generated for itself.

In step 516, the originator 502 can send the group blob, RSVP response, and the RSVP of the originator 502 to the group server 504.

In step 518, the group server 504 can validate the group blob, RSVP response, and the RSVP of the originator. The verifications of the group blob, RSVP response, and the RSVP can be similar to step 316 and step 334 of FIG. 3. A function Validate Group Blob can be used to validate that the group blob is consistent to the degree the group server 504 can verify. The function can check that the group blob parses correctly, and verify that it has appropriate signatures. A function Validate RSVP can be used to validate the originator's RSVP. The function can validate the RSVP by checking that the originator 502 accepted the invite, that the nonce in the RSVP matches with the nonce sent by the group server, and that the randomized verification key is in the group blob.

Upon successful verification, in step 520, the group server 504 can add the group blob to a group ID linked list. The group server can add the group blob as the anchor to the linked list for the corresponding Group ID. The group ID linked list may contain list of unique groups stored by the group server 504, e.g., as shown in FIG. 2A. In other implementations, only the last group blob is maintained, so step 520 can replace an old group blob with a new group blob. Seed blobs can be maintained for history to re-create old group blobs. A recent history may be stored to protect against an update being malformed.

In step 522, the group server 504 can add the RSVP of the originator 502 to the invite queue. The invite queue may store only accepted RSVP, and provide RSVP responses to only members that are in the invite queue. When another administrator device updates the group, the administrator may use the invite queue to determine the membership of devices.

In step 524, the group server 504 can store the RSVP responses and the group blob for the corresponding Group ID.

In step 526, the group server 504 can send a notice to the originator 502 that the group blob is accepted, e.g., similar to step 318 of FIG. 3.

B. Invitation

The group originator can send invites to members of the group once the group is created (after process in FIG. 5). In some embodiments, the group administrator that updated the group can send invites to new members. Further details to the invitation flow is provided below.

Figure 6:
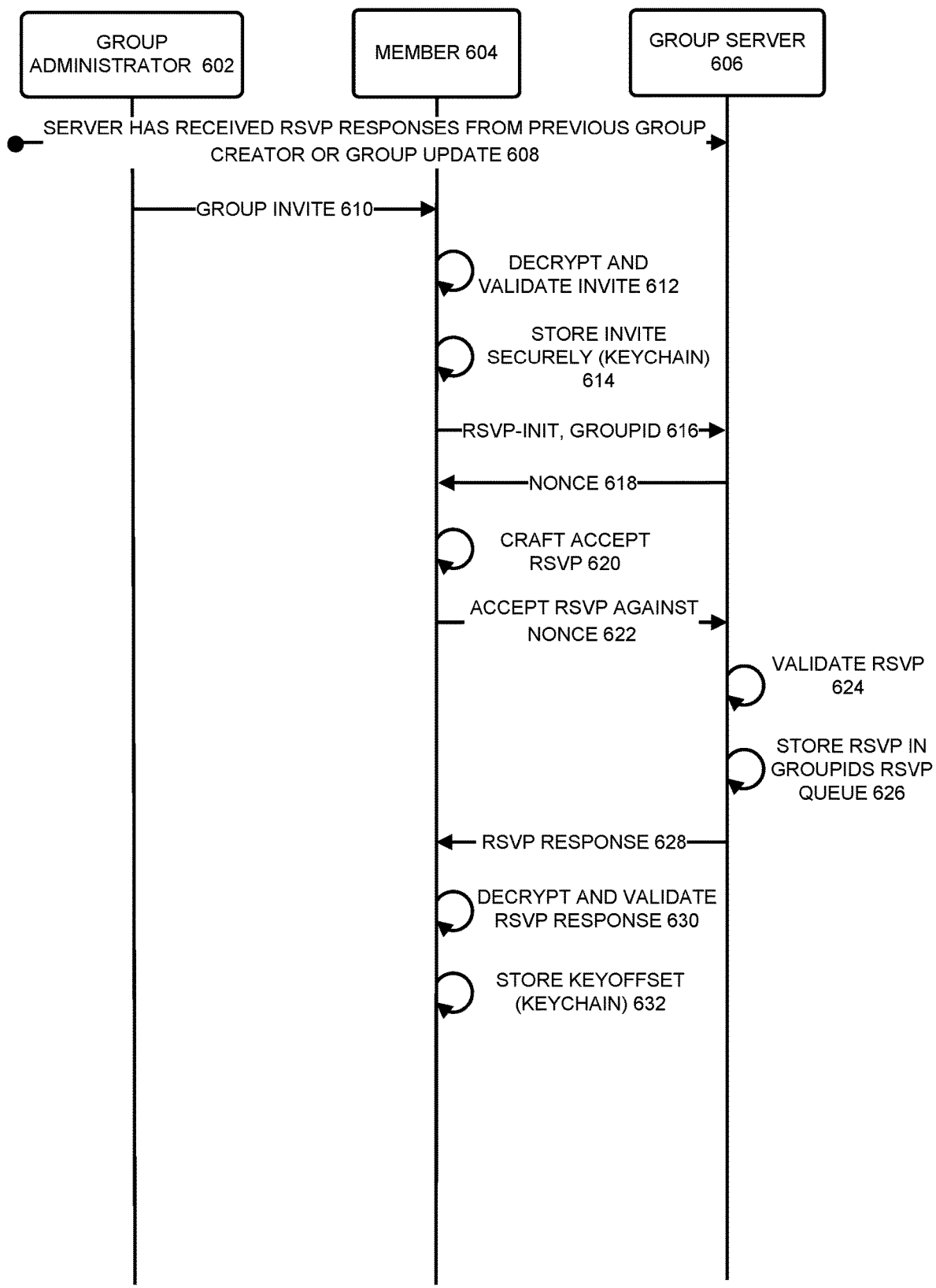
FIG. 6 shows a flow diagram of a flow for invitations.

FIG. 6 shows a flow diagram of sending invites, responding with RSVPs, and receiving RSVP responses. A group administrator 602, a member 604, and a group server 606 can be in operative communication to sending invites.

In step 608, the group server 606 can receive RSVP responses from previous group creator or group updater. The previous group creator or group updater can be a group administrator 602. The RSVP responses received by the group creator or group administrator updating the group can be validated by the group server 606. The step 608 can be similar to step 518 of FIG. 5, where the group server 504 receives the RSVP response from the originator 502.

Steps 610 to 632 can be similar to steps 320 to 342 of FIG. 3. When sending a nonce back to the member 604 in step 618, the group server can generate a nonce by using generate nonce function, which randomly generates a nonce of 96 bits. In step 632, once the member 604 accepts the invitation and receives the RSVP response back from the group server 306, the member 604 can store the RSVP response, or more specifically a key offset, in a secure store (e.g., key chain).

C. Retrieve Group Blob

A member of a group can retrieve a group blob from a group server. The group blob can be obtained by providing a group ID of the group blob to the group server. The request would return the current group blob from the group server. There is no need for validation to obtain the group blob as without an RSVP response, or key offset, the data cannot be decrypted. Further details to retrieving the group blob are provided below.

Figure 7:
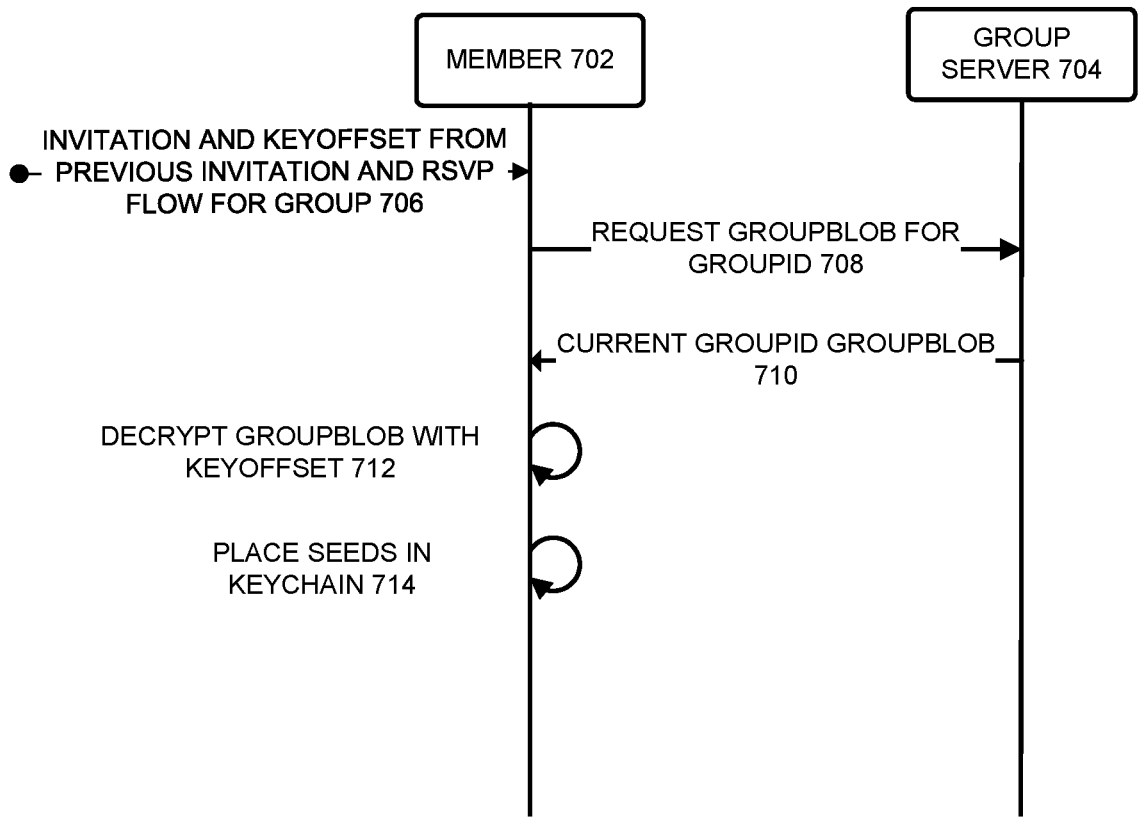
FIG. 7 shows a flow diagram of a flow for group retrieval.

FIG. 7 shows a flow for retrieving the group blob that represents the current state of the group. A member 702 can be in operative communication with a group server 704 to retrieve the group blob.

In step 706, the member 702 can have an invitation and RSVP response (for key offset) from previous invitation flow (FIG. 6) of the group. Therefore, the member 702 can have cryptographic data (e.g., a key offset) that can be applied to the obscured key in the hybrid handle to obtain the symmetric key used to decrypt the symmetric payload of the blob.

In step 708, the member 702 can request a group blob for group ID. The member can obtain the group ID via an invitation from an administrator.

In step 710, the group server 704 can check if there is a group blob for the group ID. If there is, the group server 704 can give the matching group ID group blob to the member 702. In some implementations, group server 704 can send a challenge to the member. For example, the group server 704 can send a nonce to member 702. Member 702 can sign the nonce with the diversified signing key for the group ID and then send the signature to group server 704 along with the corresponding diversified verification key. Group server 704 can verify the signature and verify that the diversified verification key is in current group blob. In one aspect of such an embodiment, only a device that is a member of the group (including invited) can fetch the group blob.

In step 712, the member 702 can take the resulting group blob and use the key offset to decrypt the symmetric payload of the group blob and retrieve the group blob's corresponding keys/seeds.

In step 714, the member 702 can place them in a secure store (e.g., a keychain) to allow the member 702 to retrieve keys later even if the member 702 is offline, and also provide a local backup in case of group corruption.

D. Retrieve Seed Blobs

A member of a group can retrieve a sequence of seed blobs from a group server. The sequence of blobs can differ based on how long it has been since a member has updated the group, if the member is a new invitee to the group, or if the member's role (admin or member) has changed within the group. Further details to retrieving the seed blobs are provided below.

Figure 8:
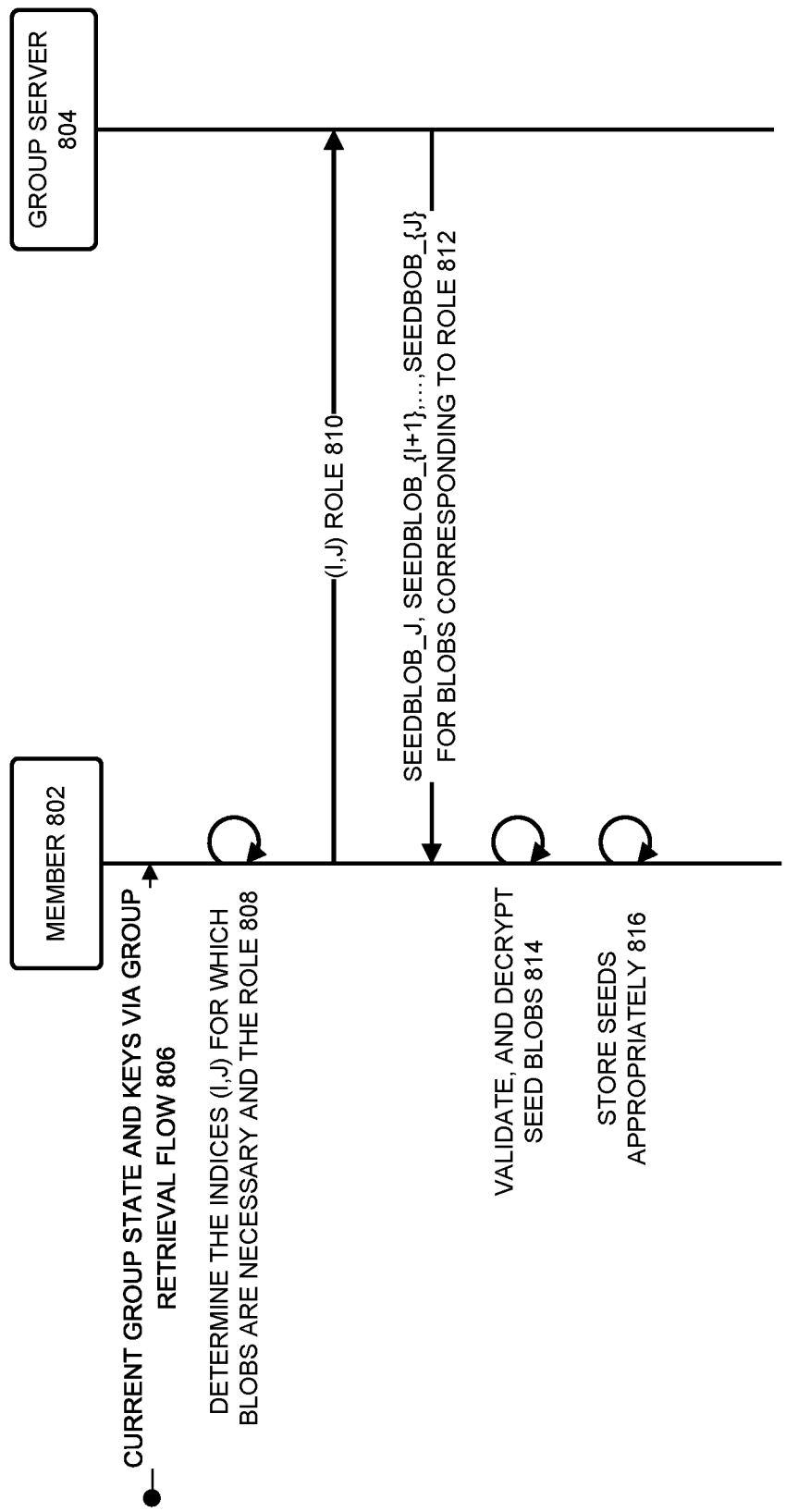
FIG. 8 shows a flow diagram of a flow for seed retrieval.

FIG. 8 shows a flow for retrieving a sequence of seed blobs for a given group. A member 802 can be in operative communication with a group server 804 to retrieve seed blobs.

In step 806, the member 802 can determine current group state (version) and keys including symmetric seed blob key and group verification key by using the group retrieval flow from FIG. 7.

In step 808, upon determining the group state and keys, the member 802 can determine which of the past seed blob the member 802 wants to open. Once the member 802 determines the past seed blob it wants to access, the member 802 can determine the sequence of seed blobs (e.g., the indices (i,j)) necessary to open the past seed blob, and the role of the member 802. For example, if the current version of seed blob is 5 and the member 802 wants to open version 2 of the seed blob, then the member 802 can request a sequence of seed blobs from version 2 through 5 (indices (2,5)) and the member's role (admin or member) in the sequence.

In step 810, the member 802 can send a request of indices (i,j) to the group server 804. The indices i and j can specify the start and end seed blob needed. For example, member 802 can specify the sequence of seed blobs that are needed. Member 802 can also have keys to access one seed blob, and the sequence of seed blobs can be sequentially accessed (with information from one seed blob used to access a next seed blob), where the final seed blob can be used to access the desired group blob. Verification can be performed to confirm that the sequence of seed blobs are consistent with each other. Such sequential access can be referred to as chaining.

In step 812, the group server 804 can return seed blobs for indices (i,j) to the member 802. If the member 802 is an administrator, the group server 804 would return admin seeds to the member 802, as the member seeds can be derived from admin seeds. If the member 802 is just a member, the group server 804 would return member seeds to the member 802.

In step 814, the member 802 can recursively validate and decrypt starting from the current seed blob j to the past seed blob i. The member 802 can validate the current seed blob j by using the group verification key obtained in step 806, as described herein. The member 802 can then decrypt the current seed blob j by using the symmetric seed blob key to access the previous version's seed and previous version's key hash. The member 802 can then use the previous version's seed and key has to generate a previous version's group verification key and symmetric seed blob key. The member 802 can then decrypt the previous seed blob, and can recursively validate and decrypt until it validates and decrypts the past seed blob i.

In step 816, once the member validates and decrypts all the sequence of seed blobs, the member 802 can store the seeds and the key hashes in a secure store (e.g., key chain).

E. Request Group Member Statuses

A member of the group can determine not only who has been invited to the group, which is what the user list from the group blob shows, but those users that have accepted the invitation, rejected the invitation, or asked to leave the group after accepting the invitation. In order to learn this information, the group member can cross reference the rsvp data with the group membership data from the group blob. Further details to retrieving the RSVP statuses are provided below.

Figure 9:
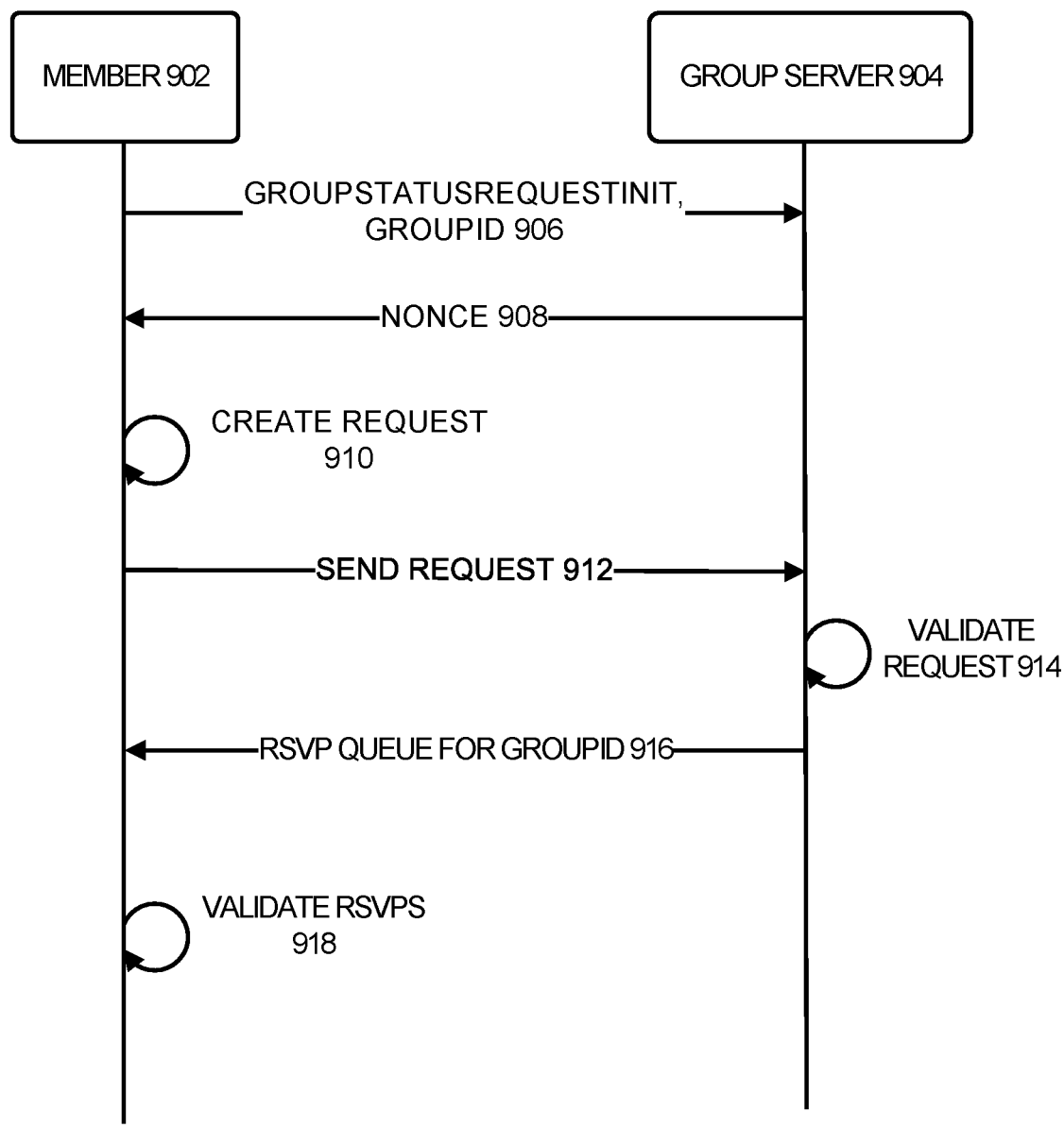
FIG. 9 shows a flow diagram of a flow for requesting group member status.

FIG. 9 shows a flow diagram of a flow for requesting group member status. A member 902 can be in operative communication with a group server 904.

In step 906, the member 902 can notify the group server 904 that it would like the current group membership for the group by sending the group status request and group ID to the group server 904. Thus, member 902 can obtain membership information for any member of the group or previous members.

In step 908, the group server 904 can generate a nonce using the Generate Nonce function (described in FIG. 6). The group server 904 sends the nonce to the member 902. The nonce can act as a challenge.

In step 910, the member 902 can create RSVP requests by using a signed signature of the group ID and the nonce. The signed signature can be generated by using the group signing key to sign the group ID and the nonce (e.g., via a call to Request RSVPs function).

In step 912, the member 902 can send the RSVP requests (i.e., the singed signature) to the group server 904.

In step 914, the group server 904 can verify the signed signature by using the group verification key and check the nonce in the signature corresponds to provided nonce, and the group ID in the signature matches with the group ID the group server 904 has.

In step 916, if the request is valid, then the group server 904 can send to the client the RSVP queue to the member 902. The RSVP queue may have RSVPs of members who accepted, rejected, or asked to leave. This can help the member 902 to know the group status (i.e., know who is part of the group).

In step 918, the member 902 can validate all the RSVPs from the server by using the Validate RSVP function from FIG. 5. The validation can use the signatures from the other members. If the RSVPs are valid, then the member 902 can combine this information with group membership information from the group blob to determine which members are currently in the group, which members declined the group, and which members asked to leave the group. If the member 902 updates the group, the member 902 can then remove the members that declined the group or have been asked to leave the group when updating the group blob.

F. Group Update

A group administrator can update the group membership or change the role of group members. The purpose of the update can be to update the membership in the group or to roll the group's keys (this is done by simply not modifying group membership while performing an update). Further details to updating the group blob can be provided below. The updates can be performed for only the members that change, e.g., that are added, deleted, or have a status change. Similar functionality as described above can be used. For example, a new group blob can be generated from existing information and any new information.

Figure 10:
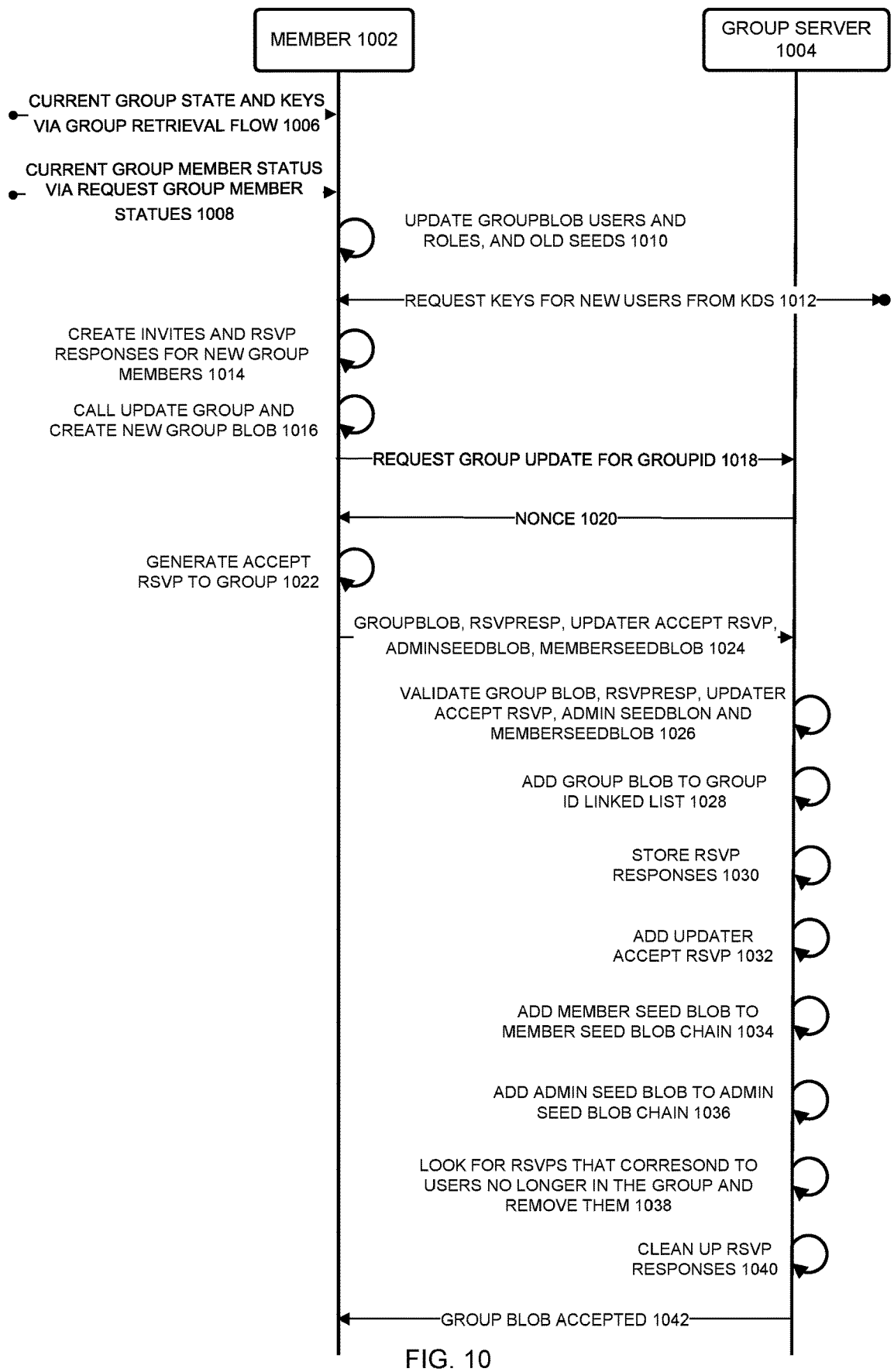
FIG. 10 shows a flow diagram of a flow for group update.

FIG. 10 shows an example flow diagram of a flow for group update. A member 1002 can be in operative communication with a group server 1004. The member 1002 can be an administrator that can update the group by communicating with the group server 1004.

In step 1006, the member 1002 can retrieve the current group blob's state and keys via group retrieval flow in FIG. 7. The group retrieval flow allows the member 1002 to decrypt the symmetric payload to obtain key information including seeds and/or the group keys.

In step 1008, the member 1002 can retrieve group membership status via request group member functionality, e.g., as described in FIG. 9. The request can provide the member 1002 with information regarding members who accepted the invite, declined the invite, or have been asked to leave the group. Such information can be referred to as invitation information.

In step 1010, the member 1002 can then create a new user list that removes any users that have requested to leave the group or rejected the group invitation and add any new users that the administrator wishes to add, with appropriate roles (admin or member). Member 1002 can also update old seeds, e.g., old seed blobs. A new version of the blob can be created, and new seeds can be created to allow for new keys corresponding to the new users, e.g., to ensure that anyone that is dropped from the group will not have access to the new keys. Thus, new seeds can be created to reflect the changes.

In step 1012, the member 1002 can request the new users' keys from a key distribution server (KDS) by providing handles (e.g., email addresses, phone number, etc.) that uniquely identify the users in KDS, and obtain the new users' public keys from the KDS. Prior to requesting new users' keys from KDS, the new users can generate two key pairs (signing/verification key pair and encryption/decryption key pair) and have registered the public keys (verification key and encryption key) to the KDS while keeping the private keys (signing key and decryption key) to themselves.

In step 1014, the member 1002 can generate invites and RSVP responses for the new users. Each RSVP response corresponds to an invite that is specific to a particular new user invited to the group. Such steps can be performed as described above, e.g., in FIGS. 1 and 3.

In step 1016, the member 1002 can create a new group blob and member and admin seed blobs using the new user list. Steps 1014 and 1016 can be similar to step 312 of FIG. 3. Other steps can be performed in a similar manner as corresponding steps in FIG. 3.

In step 1018, the member 1002 can query the group server 1004 to request an update of the group. The request can provide the group ID of the group to be updated.

In step 1020, the group server 1004 can send the requested nonce to the member 1002. The nonce can be a challenge to verify member 1002, e.g., as described above.

In step 1022, the member 1002 can use invitation information (e.g., stored in secure storage) to produce a new RSVP that is an acceptance of the group. The creation of the new RSVP can be done because the member 1002 may have previously requested to leave the group. Any update that occurs after this time can be viewed as reversal on that request, and the member 1002 can be immediately changed to an accept. If the member 1002 does not send an accept RSVP with the update, then the update can be rejected.

In step 1024, in addition to the RSVP, the member 1002 can send the RSVP Responses for new users, updated group blob, admin seed blob, and the member seed blob to the group server 1004.

In step 1026, the server can validate the RSVP Responses, the updated accepted RSVP from the member 1002, the signatures on the new group blob, admin seed blob, and the member seed blob. The validation of the group blob and the RSVP responses can be similar to step 316 of FIG. 3. The admin seed blob and the member seed blob can be validated by using the admin group verification key and member group verification key by the group server 1004. The RSVP can be validated similar to step 334 of FIG. 3 (e.g. can be done by using the validate RSVP function).

In step 1028, the group server 1004 can check that the new group blob is both signed by the new group administrator signing key and the group administrator signing key on previous last node. Assuming this is the case, group server 1004 can replace the previously stored group bob for the group ID with the new group blob. In some implementations, the group server 1004 can add the new group blob to the group ID linked list (e.g., as shown in FIG. 2A). A check can also be performed that the new seed blobs are signed by the previous administrator key.

In step 1030, the group server 1004 can store the RSVP responses, which can include new RSVP responses for the new users added to the group, in a secure server (e.g., a keychain).

In step 1032, the group server can update the RSVP queue by adding the member's accepted RSVP. Such a step can make sure that a member accepted.

In step 1034, the group server 1004 can add the new member seed blob for the updated group to the member seed blob chain. For example, the new member seed blob with member seed $S_{m4}$ can be added to the chain shown in FIG. 4B.

In step 1036, the group server can add the new admin seed blob to the admin seed blob chain. For example, the new admin seed blob with admin seed Sao can be added to the chain shown in FIG. 4B.

In step 1038, the group server 1004 can look for RSVPs that correspond to users that are no longer in the updated group blob. This can be found by identifying RSVPs that do not contain any of the diversified verification keys of the updated group blob. For RSVPs that do not correspond, the group server 1004 can remove such RSVPs from the RSVP queue.

In step 1040, the RSVP responses that do not correspond to the users of the group blob can be removed from the pool of RSVP responses stored in group server's storage. This can be found by using the diversified verification keys similar to RSVPs. There might be concern that a member who has been invited to the group as an administrator, but whom has rejected or not responded to the invite, might then push an update to the group. However, if such a user has not responded to the invite, then they cannot decrypt a group blob, and therefore cannot sign any updates for a new group blob using the current admin secret-key, and thus any updates they push may not be accepted by the server.

In step 1042, the group server 1004 can notify the member 1002 that it accepted the group blob. The member 1002 can then send invites directly to each new user, and each new user that accepted the invites can now access group resources (such as streaming services, account, etc.).

In some implementations, any new member can have access to the history of keys, e.g., via previous seed blobs. As another example implementation, any new administrator can have access to the history of keys, e.g., via previous seed blobs.

V. Methods

Methods described herein may be totally or partially performed with a computer system including one or more processors, which can be configured to perform the steps. Thus, embodiments are directed to computer systems configured to perform the steps of any of the methods described herein, potentially with different components performing a respective step or a respective group of steps. The flow for group invitation acceptance from FIG. 3 can be carried out using the aspect methods disclosed in greater detail with reference to FIGS. 11, 12, and 13.

A. Inviter

Figure 11:
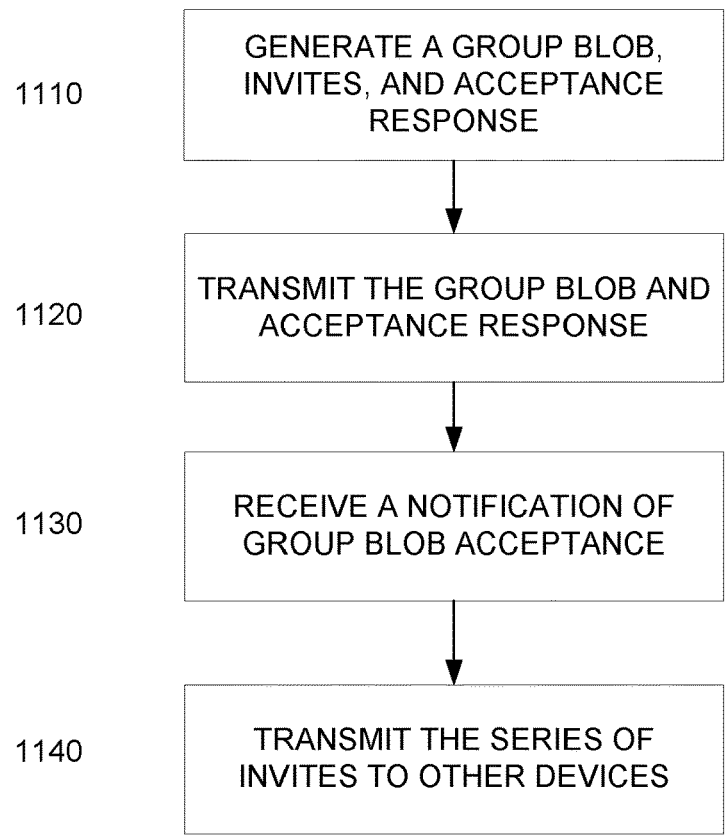
FIG. 11 shows a flow chart corresponding to managing group of devices from the perspective of an inviter device.

FIG. 11 shows a flow chart of managing a group of devices from a perspective of an administrator device. Method 1100 can be performed by the originator 302 (administrator device) generating a new group and sending invites to other devices, wherein other devices can join the group by accepting the invites.

Prior to generating a group blob, the administrator device can obtain public keys of one or more of the other device(s) from a key distribution server using user identifier(s) associated with other device(s) of the group. The administrator device can then transmit, to the server system, a request to create the group entity for accessing one or more resources, and receive a request response including the group ID for the group entity.

In step 1110, the administrator device (originator device) can generate the group blob and a series of invite(s) and acceptance response(s), each invite and acceptance response designated for other device(s), or users, of the group. Each RSVP response can correspond to an invite that is specific to a particular device (member) invited to the group. The administrator device can further generate a seed blob that includes previous seeds of previous versions of the group entity.

Each invite can include (1) a group ID and (2) a diversifying factor that is used to generate a diversified user public key from a corresponding user public key. The invite can further include a diversified verification key, RSVP response (acceptance response) digest, and any metadata needed. The diversified verification key can be included for quality assurance and debugging but is not necessary. The RSVP response digest of the invite can be used later by a member device that receives a RSVP response from a server system (group server) to validate the RSVP response. Each invite can be encrypted using an encryption key from the device the invite has been sent to.

Each acceptance response can be encrypted and include cryptographic data specific to the other device. The cryptographic data can be used by the administrator device to obscure a symmetric key that can be used to decrypt a symmetric payload in the group blob. The acceptance response can additionally include the diversified user public key. The acceptance response can be encrypted by using the encryption key from the device the invite has been sent to.

Each group blob can include an encrypted payload, which may include any one or more of: a list of users for the group entity, public keys for the group of devices, and one or more group keys and/or one or more seeds for generating the one or more group keys. The one or more group keys can be one or more group private keys, and the group blob can include the one or more group private keys and the one or more seeds for generating the one or more group private keys. Alternatively, or additionally, a group blob can include a diversified user public keys for the other device(s). As another example, the group blob can include the group ID. The group blob can further include a hybrid handle (encrypted header) and signatures of the group blob. The hybrid handle can contain an obscured key, in which the cryptographic data can be used on the obscured key using an invertible function to obtain the symmetric key.

In step 1120, the administrator device can transmit the group blob and the series of acceptance response to the server system (group server).

In step 1130, the administrator device can receive a notification for the group server accepting the group blob.

In step 1140, the administrator device can transmit the series of invites to the other device(s) of the group. The invites can enable the other device(s) to obtain the group blob from the group server. The invites can additionally help the other devices(s) generate acceptance message and receive acceptance response, which can be used to decrypt the group blob.

B. Member

Figure 12:
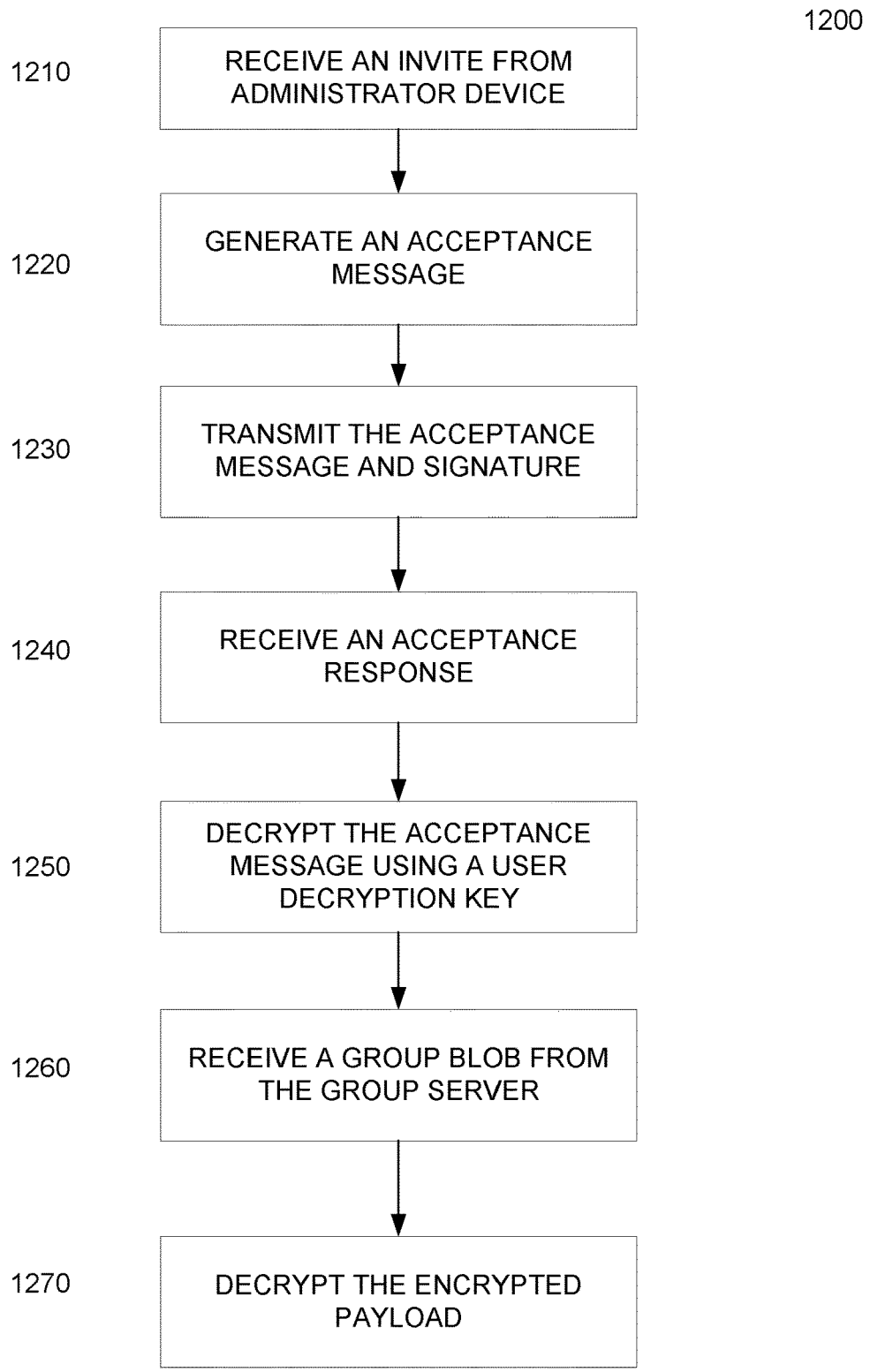
FIG. 12 shows a flow chart corresponding to managing group of devices from the perspective of a member device.

FIG. 12 shows a flow chart of managing a group of devices from a perspective of a user device. Method 1200 can be performed by a member 304 (user device) having a user public key accepting an invitation to join a group created by the originator 302 (administrator device).

In step 1210, the user device can receive an invite from the administrator device. The invite can include a group ID for a group entity including the group of devices and a diversifying factor. As another example, the invite can include a diversified user public key generated using the user public key and a diversifying factor. The invite can additionally include an acceptance response hash, and metadata. The invite can be validated by matching the diversified user public key with the user public key and the diversifying factor. The invite can be decrypted when received by the user device, and the user device can decrypt the invite by using its user decryption key. Upon decryption, the user device can store the diversifying factor and the acceptance response digest securely in a secure storage (e.g., key store). The user device can additionally, after receiving the invite, transmit a request to the group server for a nonce. The user device can then receive from the group server the nonce.

In step 1220, the user device can generate an acceptance message comprising (1) the group ID and (2) a signature of at least a portion of the acceptance message, the signature generated with a signing key of the user device and the diversifying factor. The acceptance message can further include the nonce and a status of the user (e.g., accept, reject, leave). The acceptance message may need to be accepted to receive acceptance response back from the server system.

In step 1230, the user device can transmit the acceptance message and the signature to a server for validation.

In step 1240, the user device, responsive to validation by the server, can receive an acceptance response from the server, wherein the acceptance response contains cryptographic data that are specific to the user device and that are from the administrator device.

In step 1250, the user device can decrypt the acceptance response using a user decryption key to obtain the cryptographic data. The acceptance response can be validated by matching the acceptance response digest from the invite in step 1210 with a cryptographic hash of the acceptance response. Upon successful decryption and verification, the user device can store the cryptographic data in a secure storage (e.g., a key store). The user device can then transmit a request for the group blob to the group server.

In step 1260, the user device can receive a group blob from the group server. The group blob can include an encrypted payload including a list of users for the group entity, public keys for the group of devices, and one or more group keys or one or more seeds for generating the one or more group keys. The one or more group keys can be one or more group private keys. The group blob can additionally include a hybrid handle, signatures, and group public keys. The user device can decrypt the hybrid handle by using the user decryption key and obtain an obscured key.

In some implementations, the group blob can be received from the group server with the acceptance response. Thus, steps 1240 and 1260 may be performed in one communication. In other implementations, the user device can retrieve the group blob from the group server.

In step 1270, the user device can decrypt the encrypted payload of group blob using the cryptographic data stored from step 1250 to obtain the one or more seeds or the one or more group keys. The user device can decrypt the encrypted payload by applying the cryptographic data to the obscured key using an invertible function to obtain a symmetric key. The user device can then use the symmetric key to decrypt the encrypted payload. The user device can then obtain at least one or more seeds, one or more group signing keys, and user public keys. The user device can place the one or more seeds and the public keys for the group of devices in a secure storage (e.g., key store). The user device can also use the one or more group signing keys to access a protected resource.

C. Server

Figure 13:
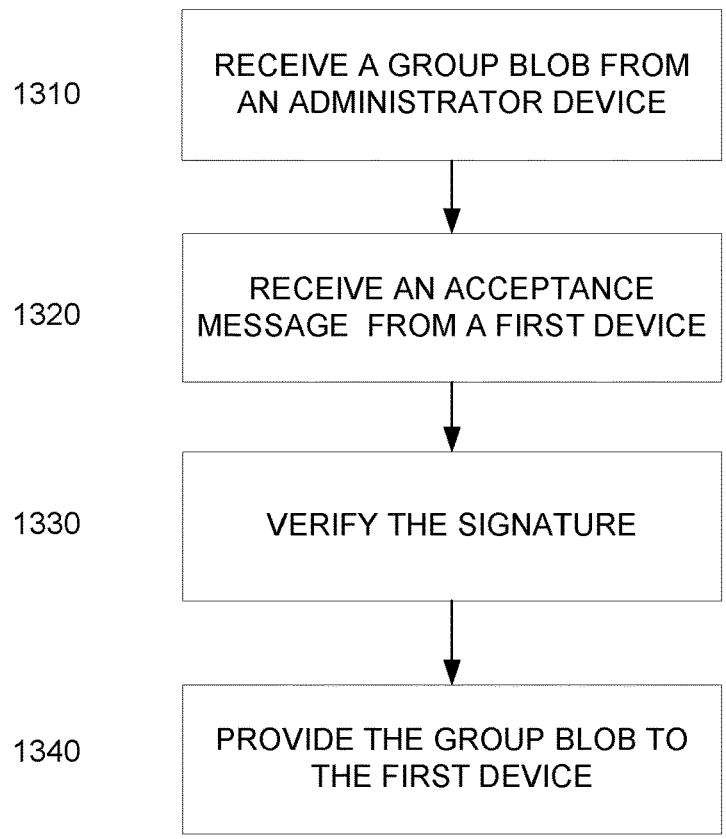
FIG. 13 shows a flow chart corresponding to managing group of devices from the perspective of a cloud server.

FIG. 13 shows a flow chart of managing a group of devices from a perspective of a server system. Method 1200 can be performed by a group server 306 (server system) by validating the information provided by the administrator device and providing the necessary information such as acceptance response and a group blob to other devices.

Prior to receiving a group blob, the server system can receive, from the administrator device, a request to create the group entity for accessing one or more resources. The server system can then provide to the administrator device a request response including the group ID for the group entity.

In step 1310, the server system can receive the group blob, wherein the group blob can include (1) an encrypted payload including a list of users for the group entity, public keys for the group of devices, and one or more group keys or one or more seeds for generating the one or more group keys, (2) diversified user public keys for the other device(s), and (3) a group ID. The group blob can additionally include an encrypted header, group public keys, and group signatures. The encrypted header can include an obscured key generated from a symmetric key and a cryptographic data using an invertible function, and the encrypted payload can be encrypted using the obscured key. The diversified user public key can be generated using a corresponding user public key and a diversifying factor from the administrator device.

The server system can also receive an acceptance response and a seed blob. The seed blob can include previous seeds of previous versions of the group entity. The acceptance response can include encrypted cryptographic data specific to the other device(s). The encrypted cryptographic data can be encrypted using the corresponding user public key of the other device(s). The group server can validate the group blob and the acceptance response and send a notification for accepting the group blob and the acceptance response.

After sending the notification, the server system can receive a request from a first device of the other devices for a nonce. The server system, upon receiving the request, can send to the first device, the nonce.

In step 1320, the server system can receive an acceptance message from a first device of the other device(s), the acceptance message comprising the group ID and a signature of at least a portion of the acceptance message, the signature generated with a signing key of the other device and the diversifying factor. The acceptance message can additionally include the nonce sent by the server system.

In step 1330, the server system can verify the signature using the diversified user public key of the first device. The server system can further verify the acceptance message by verifying that the first device accepted the invite, that the nonce in the acceptance message matches with the nonce sent by the server system, and that the diversified user public key is in the group blob. The server system, upon successful validation, can store the acceptance message in acceptance message (RSVP) queue, and send an acceptance response to the first device.

In step 1340, the server system can receive a request for the group blob from the first device. In response to the request, the server system can provide the group blob to the first device. The server system can give the group blob to the first device after receiving a request from the first device for the group blob.

VI. Applications

Groups can have identities beyond that of its members. Groups can possess resources (e.g., information, services, location, payment services, etc.) within the cloud server's ecosystem, and the possession of the resources may not be limited when group members change. A resource can be a protected resource in that not anybody can access, e.g., limited to only members of the group. Different groups (e.g., applications) can have different group keys, and a member can be in one or more groups. The members can use the group signing keys to authenticate themselves to the group server that they are part of the group, in which the group server can validate the members by using the group verification keys.

When there is a new update to the group, and there are new members, the new members are able to access the group verification key of past versions of the group. This can be done by recursively validating and decrypting seed blob to access the seed of the past versions (described in FIG. 9). Therefore, the new members are able to access the resources that were available to the past versions of the group, as long as the subscription is still valid within the cloud server.

A. Shared Information

A group can possess information such as photos, documents, communication session state, etc. that can be assessed by the members of the group. The members can authenticate themselves to access the information by using the group signing keys, in which the cloud server can validate by using the corresponding group verification key. The information can be stored in the cloud server, and access to the information can expire. For example, if the group is subscribed to use a storage that can hold information such as photos or documents, after the subscription ends, the members of the group can no longer access the storage stored in the cloud server. In some embodiments, the information can be stored in a different server. In such case, the cloud server can give a credential to the member of the group upon successful authentication, in which the member can get access to the information by using the credential.

B. Shared Services

A group can possess services such as steaming services, music services, software service, etc. Because the group can contain multiple members, the subscription fee for shared services can be more expensive as opposed to individual users. The credential for the services can be stored within the cloud server, and each member of the group can obtain the credential by authenticating to the cloud server that its part of the group. The credential can be a session token and by proving and validating this token, the person can get access to the particular service. In some embodiments, the cloud server can provide services. In such case, the member can use the services directly after a successful authentication. This can be done by using the group signing key, in which the cloud server can verify by using the group verification key.

C. Shared Access to a Location

A group can possess control access to a location such as door lock, car key, climate control, etc. The group can have access to digital car key, door locks, etc. Instead of assigning different physical keys to control access, the members can be added or deleted to the group to give the control access to a location. The members can be assigned credential that can give control access to a location. For example, a new member can use the group signing key to authenticate itself to the cloud server, in which the cloud server then verifies the new member using the verification key. Upon successful validation, the new member can give a credential or direct access (if managed by the cloud server) to the location (door lock, car key, garage door, etc.).

D. Shared Payment Credentials

A group can possess payment credential such as a credit card, digital wallet, etc. The payment credential information can be stored in the cloud server, in which upon a successful validation, the cloud server can provide the payment credential. There can be additional level of security compared to other shared resources such as multi-factor authentication. For example, the member of the group can authenticate itself to the cloud server using the group signing key. The cloud server can validate the member by using the group verification key, and additionally send a message directly to the member (e.g., text message) for an extra authentication. Once the member successfully authorizes, the payment credential can be shared to the member.

VII. Example Advantages

Embodiments can have various advantages. One advantage is that a group in the group server can support ownership of resources by the group as opposed to an individual of a group. Having a group own resources directly can prevent the need to duplicate resource ownership across multiple group entities. The ownership of the resources can be maintained even when group membership changes.

Another advantage is that group administrators can have sole control over membership so that a provider (e.g., cloud server) cannot change membership of a group. All group members can be anonymous to the cloud server, and since the cloud server does not know the members comprising the group, the cloud server cannot add or delete the membership in a group. In various implementations, only certain members (administrators) can modify membership of the group, and only invited members can retrieve group keys. In the case of membership changes, the group can still be updated while still maintaining anonymity to the cloud server.

Yet another advantage is that the group members can have access to the complete history of the group's encryption keying material, ensuring that current group members can access any materials encrypted under any previous key of the group. Therefore, the group members can access any group member information of the past, regardless of whether the member just joined or been since when the group was created.

VIII. Example Device

Figure 14:
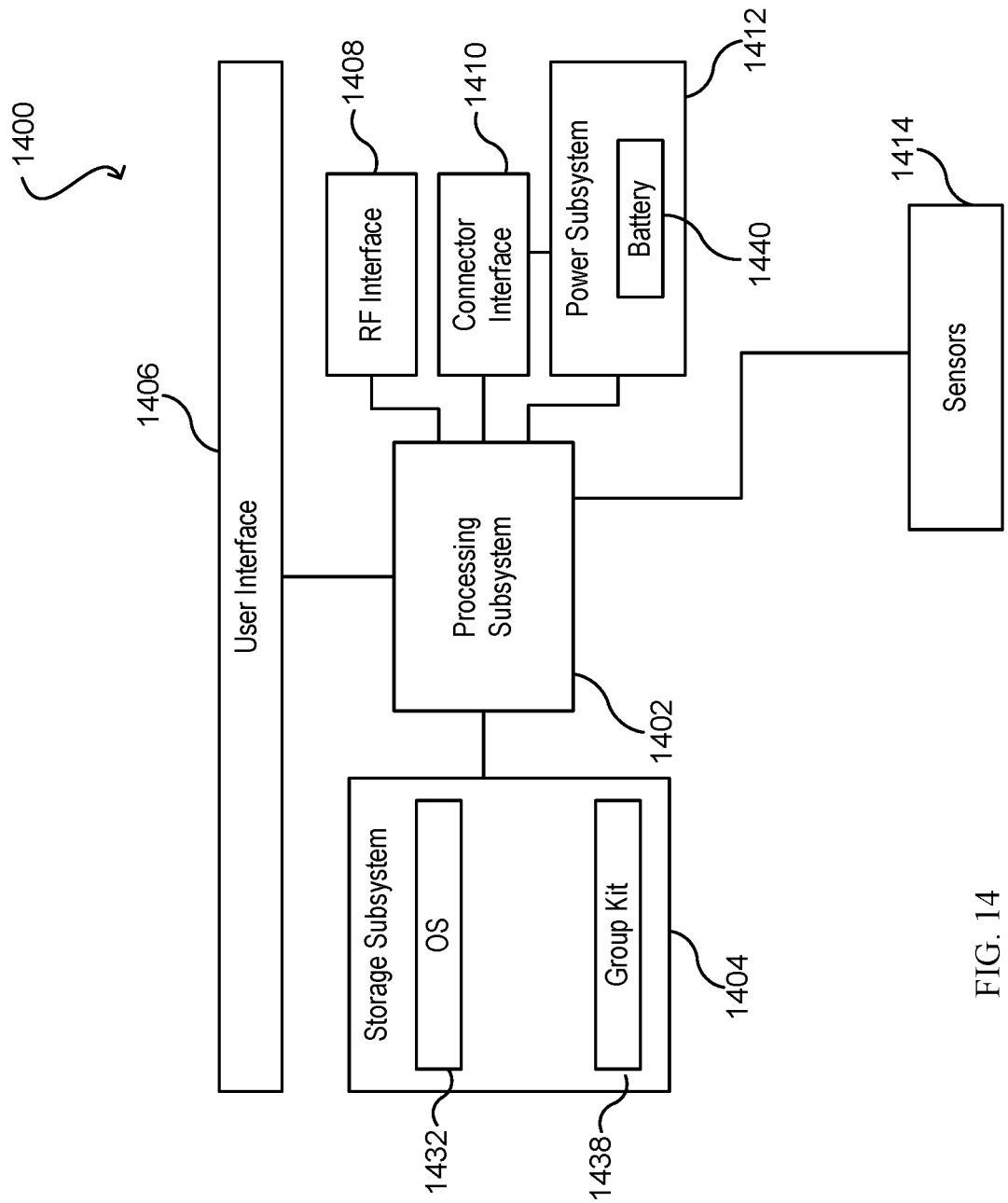
FIG. 14 is a block diagram of an exemplary computing device according to certain aspects of the present disclosure.

FIG. 14 is a block diagram of a computing device 1400 according to certain embodiments. The computing device 1400 can serve as a target computing device as previously described. However, computing device 1400 may be implemented as any wearable or implantable device, a mobile device, or server, or a desktop/notebook computer system.

Computing device 1400 can include processing subsystem 1402, storage subsystem 1404, user interface 1406, RF interface 1408, connector interface 1410, power subsystem 1412, and sensors 1414. Computing device 1400 can also include other components (not explicitly shown).

Storage subsystem 1404 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 1404 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 1404 can also store one or more application programs to be executed by processing subsystem 1402 (e.g., video game programs, personal information management programs, media playback programs, interface programs associated with particular host devices and/or host device functionalities, etc.).

User interface 1406 can include any combination of input and output devices. A user can operate input devices of user interface 1406 to invoke the functionality of computing device 1400 and can view, hear, and/or otherwise experience output from computing device 1400 via output devices of user interface 1406. In the case of an implanted medical device, the user interface may not be directly wired to the other components, may only provide output function, or may not exist at all. Otherwise, examples of output devices include a display speakers and a haptic output generator.

Computing device 1400 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

An alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

Examples of input devices include a microphone, a touch sensor, or a camera. A microphone can include any device that converts sound waves into electronic signals. A touch sensor can include, e.g., a capacitive sensor array with the ability to localize contacts to a particular point or region on the surface of the sensor and in some instances, the ability to distinguish multiple simultaneous contacts. In some embodiments, a touch sensor can be overlaid over a display to provide a touchscreen interface, and processing subsystem 1402 can translate touch events (including taps and/or other gestures made with one or more contacts) into specific user inputs depending on what is currently displayed on a display. In some embodiments, a touch sensor can also determine a location of a touch on a screen. A touch sensor may be incorporated into or on the display stack in order to determine a location of a touch. The touch sensor may be self-capacitive in certain embodiments, mutual-capacitive in others, or a combination thereof.

A display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments. In some embodiments, user interface 1406 can provide output to and/or receive input from an auxiliary device such as a headset.

Processing subsystem 1402 can be implemented as any electronic device capable of processing, receiving, or transmitting data or instructions. Processing subsystem 1402 can include one or more integrated circuits. For example, processing subsystem 1402 may include one or more of: one or more single core or multi core microprocessors or microcontrollers, a central processing unit (CPU), an application-specific integrated circuit (ASIC), a digital signal processor (DSP), or additional or combinations of such devices. In operation, processing subsystem 1402 can control the operation of computing device 1400. In various embodiments, processing subsystem 1402 can execute a variety of programs in response to program code and can maintain multiple concurrently executing programs or processes. At any given time, some or all of the program code to be executed can be resident in processing subsystem 1402 and/or in storage media such as storage subsystem 1404.

Through suitable programming, processing subsystem 1402 can provide various functionality for computing device 1400. For example, in some embodiments, processing subsystem 1402 can execute a base OS 1432 and various applications. In some embodiments, computing device 1400 includes group kit 1438, which includes functionality described herein for creating and/or managing a group of devices.

RF (radio frequency) interface 1408 can allow computing device 1400 to communicate wirelessly with various host devices. RF interface 1408 can include RF transceiver components such as an antenna and supporting circuitry to enable data communication over a wireless medium, e.g., using Wi Fi (IEEE 802.11 family standards), Bluetooth® (a family of standards promulgated by Bluetooth SIG, Inc.), or other protocols for wireless data communication. RF interface 1408 can be implemented using a combination of hardware (e.g., driver circuits, antennas, modulators/demodulators, encoders/decoders, and other analog and/or digital signal processing circuits) and software components. In some embodiments, RF interface 1408 can provide near field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 1408.

Connector interface 1410 can allow computing device 1400 to communicate with various other devices via a wired communication path, e.g., using Universal Serial Bus (USB), universal asynchronous receiver/transmitter (UART), or other protocols for wired data communication. In some examples, an untrusted machine-code program may be received from a USB flash drive that through USB. In some examples, connector interface 1410 can provide a power port, allowing computing device 1400 to receive power, e.g., to charge an internal battery. For example, connector interface 1410 can include a connector such as a mini USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from a host device in analog and/or digital formats.

Sensors 1414 can include various electronic, mechanical, electromechanical, optical, or other devices that provide information related to external conditions around computing device 1400. Sensors 1414 in some embodiments can provide digital signals to processing subsystem 1402, e.g., on a streaming basis or in response to polling by processing subsystem 1402 as desired. Any type and combination of sensors can be used; examples include an accelerometer, a magnetometer, a gyroscope sensor, and a GPS receiver.

In the case of a wearable computing device, some sensors can provide information about the location and/or motion of computing device 1400. For example, an accelerometer can sense acceleration (relative to freefall) along one or more axes, e.g., using piezoelectric or other components in conjunction with associated electronics to produce a signal. A magnetometer can sense an ambient magnetic field (e.g., Earth's magnetic field) and generate a corresponding electrical signal, which can be interpreted as a compass direction. A gyroscope sensor can sense rotational motion in one or more directions, e.g., using one or more MEMS (micro electro mechanical systems) gyroscopes and related control and sensing circuitry. A GPS receiver can determine location based on signals received from GPS satellites. Other sensors can also be included in addition to or instead of these examples.

In the case where computing device 1400 is a medical device, sensors 1414 may include biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. In some embodiments, the device may also measure blood pressure, ultraviolet exposure, etc. Depending on the sensors incorporated into or associated with the computing device, a variety of user characteristics may be measured and/or estimated, thereby permitting different health information to be provided to a user. In some examples, the sensed biometric information may be used to generate alerts on computing device 1400 or on other devices by using RF interface 1408 or connector interface 1410.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Power subsystem 1412 can provide power and power management capabilities for computing device 1400. For example, power subsystem 1412 can include a battery 1440 (e.g., a rechargeable battery) and associated circuitry to distribute power from battery 1440 to other components of computing device 1400 that require electrical power. In some embodiments, power subsystem 1412 can also include circuitry operable to charge battery 1440, e.g., when connector interface 1410 is connected to a power source. In some embodiments, power subsystem 1412 can include a "wireless" charger, such as an inductive charger, to charge battery 1440 without relying on connector interface 1410. An inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes. In some embodiments, power subsystem 1412 can also include other power sources, such as a solar cell or AC power supply, in addition to or instead of battery 1440.

In some embodiments, control functions of power subsystem 1412 can be implemented using programmable or controllable circuits operating in response to control signals generated by processing subsystem 1402 in response to program code executing thereon. It will be appreciated that computing device 1400 is illustrative and that variations and modifications are possible.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include one or more memories, such as random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

What is claimed is:

1. A method of managing a group of devices including an administrator device, the method comprising performing, by the administrator device:
    generating a group blob, invite(s), and acceptance response(s), each invite and acceptance response designated for other device(s) of the group,
    wherein each invite includes a group ID corresponding to a group entity and a diversifying factor that is used to generate a diversified user public key from a corresponding user public key,
    wherein each acceptance response includes encrypted cryptographic data specific to another device, the encrypted cryptographic data including cryptographic data, and
    wherein the group blob includes (1) an encrypted payload including a list of users for the group entity, public keys for the group of devices, and one or more group keys or one or more seeds for generating the one or more group keys and (2) the diversified user public keys for the other device(s);
    transmitting, to a server system, the group blob, the group ID, and the acceptance response(s);
    receiving, from the server system, a notification of the server system accepting the group blob; and
    transmitting the invite(s) to the other device(s) of the group, wherein the invite(s) enable the other device(s) to obtain the group blob from the server system.

2. The method of claim 1, wherein the group blob includes the group ID.

3. The method of claim 1, wherein the acceptance response includes the diversified user public key, and wherein the invite includes the diversified user public key.

4. The method of claim 1, wherein the acceptance response and the invite are encrypted using the corresponding user public key.

5. The method of claim 1, further comprising:
    encrypting the encrypted payload using a symmetric key, wherein the group blob includes an encrypted header that includes an obscured key generated from the symmetric key and the cryptographic data using an invertible function.

6. The method of claim 1, further comprising:
    obtaining public keys of one or more of the other device(s) from a key distribution server using user identifier(s) associated with other device(s) of the group.

7. The method of claim 1, further comprising:
    transmitting, to the server system, a request to create the group entity for accessing one or more resources; and
    receiving, from the server system, a request response including the group ID for the group entity.

8. The method of claim 1, further comprising:
    generating a seed blob that includes one or more previous seeds of one or more previous versions of the group entity.

9. The method of claim 1, wherein the one or more group keys are one or more group private keys, and wherein the group blob includes the one or more group private keys and the one or more seeds for generating the one or more group private keys.

10. A computing device comprising:
    one or more memories; and
    one or more processors in communication with the one or more memories and configured to execute instructions stored in the one or more memories to perform operations of managing a group of devices including the computing device, the operations comprising:
    generating a group blob, invite(s), and acceptance response(s), each invite and acceptance response designated for other device(s) of the group,
    wherein each invite includes a group ID corresponding to a group entity and a diversifying factor that is used to generate a diversified user public key from a corresponding user public key,
    wherein each acceptance response includes encrypted cryptographic data specific to another device, the encrypted cryptographic data including cryptographic data, and
    wherein the group blob includes (1) an encrypted payload including a list of users for the group entity, public keys for the group of devices, and one or more group keys or one or more seeds for generating the one or more group keys and (2) the diversified user public keys for the other device(s);
    transmitting, to a server system, the group blob, the group ID, and the acceptance response(s);
    receiving, from the server system, a notification of the server system accepting the group blob; and
    transmitting the invite(s) to the other device(s) of the group, wherein the invite(s) enable the other device(s) to obtain the group blob from the server system.

11. The computing device of claim 10, wherein the group blob includes the group ID.

12. The computing device of claim 10, wherein the acceptance response includes the diversified user public key, and wherein the invite includes the diversified user public key.

13. The computing device of claim 10, wherein the operations further comprise:
    encrypting the encrypted payload using a symmetric key, wherein the group blob includes an encrypted header that includes an obscured key generated from the symmetric key and the cryptographic data using an invertible function.

14. The computing device of claim 10, wherein the operations further comprise:
obtaining public keys of one or more of the other device(s) from a key distribution server using user identifier(s) associated with other device(s) of the group.

15. The computing device of claim 10, wherein the operations further comprise:
transmitting, to the server system, a request to create the group entity for accessing one or more resources; and
receiving, from the server system, a request response including the group ID for the group entity.

16. The computing device of claim 10, wherein the operations further comprise:
generating a seed blob that includes one or more previous seeds of one or more previous versions of the group entity.

17. A non-transitory computer-readable medium storing a plurality of instructions that, when executed by one or more processors of a computing device, cause the one or more processors to perform operations of a method of managing a group of devices including the computing device, the method comprising:
generating a group blob, invite(s), and acceptance response(s), each invite and acceptance response designated for other device(s) of the group,
wherein each invite includes a group ID corresponding to a group entity and a diversifying factor that is used to generate a diversified user public key from a corresponding user public key,
wherein each acceptance response includes encrypted cryptographic data specific to another device, the encrypted cryptographic data including cryptographic data, and
wherein the group blob includes (1) an encrypted payload including a list of users for the group entity, public keys for the group of devices, and one or more group keys or one or more seeds for generating the one or more group keys and (2) the diversified user public keys for the other device(s);
transmitting, to a server system, the group blob, the group ID, and the acceptance response(s);
receiving, from the server system, a notification of the server system accepting the group blob; and
transmitting the invite(s) to the other device(s) of the group, wherein the invite(s) enable the other device(s) to obtain the group blob from the server system.

18. The non-transitory computer-readable medium of claim 17, wherein the acceptance response includes the diversified user public key, and wherein the invite includes the diversified user public key.

19. The non-transitory computer-readable medium of claim 17, wherein the method further comprises:
encrypting the encrypted payload using a symmetric key, wherein the group blob includes an encrypted header that includes an obscured key generated from the symmetric key and the cryptographic data using an invertible function.

20. The non-transitory computer-readable medium of claim 17, wherein the method further comprises:
generating a seed blob that includes one or more previous seeds of one or more previous versions of the group entity.

* * * * *